US008884561B2

United States Patent
Furutani et al.

(10) Patent No.: US 8,884,561 B2
(45) Date of Patent: Nov. 11, 2014

(54) AC MOTOR DRIVING APPARATUS

(75) Inventors: Shinichi Furutani, Tokyo (JP); Akiko Tabuchi, Tokyo (JP); Kazuhiko Tsutsui, Tokyo (JP); Yoji Tsutsumishita, Tokyo (JP); Jun Hattori, Tokyo (JP); Manabu Ohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 13/818,120

(22) PCT Filed: Sep. 6, 2010

(86) PCT No.: PCT/JP2010/065221
§ 371 (c)(1),
(2), (4) Date: Feb. 21, 2013

(87) PCT Pub. No.: WO2012/032589
PCT Pub. Date: Mar. 15, 2012

(65) Prior Publication Data
US 2013/0154531 A1   Jun. 20, 2013

(51) Int. Cl.
*H02P 6/14* (2006.01)
*B60L 15/00* (2006.01)
*B60L 11/18* (2006.01)
*H02P 27/06* (2006.01)
*B60L 7/14* (2006.01)
*H02J 7/34* (2006.01)
*B60L 3/00* (2006.01)
*B60L 11/00* (2006.01)
*B29C 45/76* (2006.01)
*H02M 5/458* (2006.01)

(52) U.S. Cl.
CPC ............ *H02P 27/06* (2013.01); *H02P 2201/09* (2013.01); *B60L 15/007* (2013.01); *Y02T 10/7022* (2013.01); *B60L 2240/545* (2013.01); *H02P 2201/07* (2013.01); *B60L 11/1803* (2013.01); *Y02T 10/7216* (2013.01); *B60L 2210/10* (2013.01); *B60L 7/14* (2013.01); *H02J 7/34* (2013.01); *B60L 3/003* (2013.01); *Y02T 10/7005* (2013.01); *Y02T 10/644* (2013.01);
*B60L 11/005* (2013.01); *B29C 2045/7673* (2013.01); *H02M 5/458* (2013.01)
USPC .................................................... 318/400.26

(58) Field of Classification Search
None
See application file for complete search history.

(56) References Cited

U.S. PATENT DOCUMENTS

| 6,175,511 B1 * | 1/2001 | Ooba ............................... 363/37 |
| 6,732,838 B1 * | 5/2004 | Okada et al. ................... 187/290 |
| 2009/0218976 A1 * | 9/2009 | Iwashita et al. ............... 318/441 |

FOREIGN PATENT DOCUMENTS

| JP | 2001 139244 | 5/2001 |
| JP | 2001 186689 | 7/2001 |

(Continued)

OTHER PUBLICATIONS

Office Action and Search Report issued Sep. 18, 2013 in Taiwanese Patent Application No. 100124549 (with partial English translation).

(Continued)

*Primary Examiner* — Bentsu Ro
*Assistant Examiner* — Zoheb Imtiaz
(74) *Attorney, Agent, or Firm* — Oblon, Spivak, McClelland, Maier & Neustadt, L.L.P.

(57) ABSTRACT

In the case where DC power from a DC power supply is converted to AC power by an inverter and supplied to an AC motor, a power compensator is connected in parallel with a DC power input portion of the inverter, and a control device of the power compensator charges/discharges a power storage device to perform a power compensation process A when power demand for the AC motor exceeds a predetermined value, and takes into account power allowance which can be inputted and outputted from the DC power supply to the power storage device and performs a power storage adjustment process B of performing auxiliary charge of the power storage device within the range of the power allowance when the power compensation process A is unnecessary.

6 Claims, 18 Drawing Sheets

(56) References Cited

FOREIGN PATENT DOCUMENTS

| | | |
|---|---|---|
| JP | 2001 320893 | 11/2001 |
| JP | 2004 343826 | 12/2004 |
| JP | 2005 328618 | 11/2005 |
| JP | 2009 136058 | 6/2009 |
| JP | 4339916 | 10/2009 |

OTHER PUBLICATIONS

Kuo-Hen Chao, et al., "New Control Methods for Single Phase PWM Regenerative Rectifier with Power Decoupling Function," PEDS2009, Nov. 2-5, 2009, pp. 1091-1096.

International Search Report Issued Nov. 22, 2010 in PCT/JP10/65221 Filed Sep. 6, 2010.

* cited by examiner

AC MOTOR DRIVING APPARATUS

TECHNICAL FIELD

The present invention relates to an AC motor driving apparatus which converts DC power from a DC power supply to AC power by an inverter and supplies the AC power to an AC motor, and particularly relates to an AC motor driving apparatus including a power compensator which performs compensation of power for DC power supplied to an inverter.

BACKGROUND ART

A conventional AC motor driving apparatus includes a DC power supply which supplies DC power, an inverter which converts the DC power from the DC power supply to AC power and supplies the AC power to an AC motor, and a control device for them. As the DC power supply used in this case, there are various types depending on application of the AC motor. For example, when the AC motor is a motor for driving an electric rolling stock, a DC wire is the DC power supply. In addition, when the AC motor is an industrial motor such as a servomotor, AC power from a power supply system is rectified by a converter to supply DC power.

Meanwhile, AC motors having various characteristics have been put into production. Among them, there is an AC motor having two types of rated outputs, short-time rated output and continuous rated output. In such a case, the short-time rated output of the AC motor is set so as to have a very high value as compared to the continuous rated output. The reason is that, for example, in the case where the AC motor is operated to accelerate or decelerate, when the AC motor operates at the short-time rated output only for a relatively short time such as during acceleration or deceleration, it is possible to reduce the time required for speed change. In this case, it is necessary to select the DC power supply and the inverter according to the short-time rated output, and, accordingly, a power supply facility also needs to have a capacity which can tolerate the short-time rated output.

However, when an actual operation is performed, peak power is equivalent to the short-time rated output, but the average power may be decreased on a time average basis. Thus, a problem arises that the prepared power supply facility is not effectively used. And, due to the preparation of the power supply facility according to the short-time rated output, it may be difficult to introduce the apparatus.

For solving such a problem, various techniques have conventionally been developed. For example, in the conventional technique in Patent Document 1 described below, a power compensator including a capacitor which stores power and a step-up/down circuit which converts a voltage level is provided, and when power or a current used by an inverter or a converter exceeds a predetermined value, energy is discharged from the power compensator to suppress a current peak of a DC power supply. In addition, in the conventional technique in Patent Document 2 described below, when the voltage or current of a DC bus bar connected to an inverter exceeds a predetermined value, power of a power compensator is discharged or absorbed.

When such a conventional technique disclosed in Patent Document 1 or 2 is applied, power stored in the power compensator is discharged while demand for peak power occurs, thereby enabling AC motor driving to be realized at the short-time rated output over the limitation on the capacity of the power supply facility.

Patent Document 1: Japanese Patent No. 4339916
Patent Document 2: Japanese Laid-Open Patent Publication No. 2005-328618

DISCLOSURE OF THE INVENTION

Problems to be Solved by the Invention

However, the conventional techniques disclosed in Patent Documents 1 and 2 described above have the following problems. Specifically, in these Patent Documents 1 and 2, when demand for power exceeding a magnitude that can be exchanged by the DC power supply occurs in a power running state, power is discharged from the power compensator. Then, in order to meet such power demand, it is necessary to previously charge the power compensator as appropriate. In this case, the charging is performed mainly in a regeneration state where energy returns from the AC motor.

Here, when power demands in power running and in regeneration occur alternately with the substantially same frequency, charging and discharging of power with respect to the power compensator are balanced and thus almost no problem arises. However, when power demand in the same state such as only in power running or only in regeneration is continued, power stored in the power compensator becomes short or excessive. For example, in the case where a regeneration state is less frequent and a power running operation is mainly performed, such as in the case where the AC motor is applied to a fan or a pump or is used for cutting by a working machine, a problem prominently appears that the power stored in the power compensator becomes short.

In addition, for example, when compensation is performed for power associated with acceleration or deceleration of the AC motor, the magnitude of power demand in regeneration is smaller than the magnitude of power demand in power running in many cases due to loss of the AC motor, the inverter, and further the power compensator itself. Therefore, when the power compensator is charged mainly in a regeneration state as in the conventional techniques disclosed in Patent Documents 1 and 2, the amount of power of the power compensator tends to be short.

The problem of power shortage or power excess of the power compensator can relatively easily be dealt with when a power storage device, such as a capacitor, included in the power compensator is made to have a large capacity. As a result, problems, such as causing increase in cost, size, and weight, arise.

The present invention has been made to solve the problems described above, and an object of the present invention is to provide an AC motor driving apparatus which allows reliable power compensation to always be realized even when power demand in the same state such as power running or regeneration is continued, even if a power storage device, such as a capacitor, included in a power compensator is not made to have a large capacity.

Solution to the Problems

According to the present invention, an AC motor driving apparatus includes: a DC power supply which supplies DC power; an inverter which converts the DC power to AC power and supplies the AC power to an AC motor; and a power compensator which is connected in parallel with a DC power input portion of the inverter. The power compensator includes: a step-up/down circuit which converts a voltage level of the DC power; a power storage device which absorbs/discharges power; and a control device which controls the step-up/down circuit and the power storage device, and the control device performs: a power compensation process A in which power of the power storage device is discharged or absorbed such that the absolute value of DC power exchanged by the DC power supply does not exceed a DC power supply power limit determined on the basis of a characteristic of the DC power supply; and a power storage adjustment process B in which the power is discharged or absorbed such that a voltage of the power storage device becomes a predetermined value.

Effect of the Invention

According to the present invention, in driving the AC motor, when power demand for the AC motor exceeds a predetermined value, the power compensator charges/discharges the power storage device to perform power compensation, and when power compensation is unnecessary, the power compensator obtains a power allowance of power inputted and outputted to the power storage device on the basis of the DC power supply power limit and required power of the inverter, and performs auxiliary charge of the power storage device within the range of the power allowance to store power. Thus, even if the power storage device, such as a capacitor, included in the power compensator is not made to have a large capacity, power compensation can be always reliably realized even when power demand in the same state such as power running or regeneration is continued.

BEST MODE FOR CARRYING OUT THE INVENTION

Embodiment 1

Figure 1:
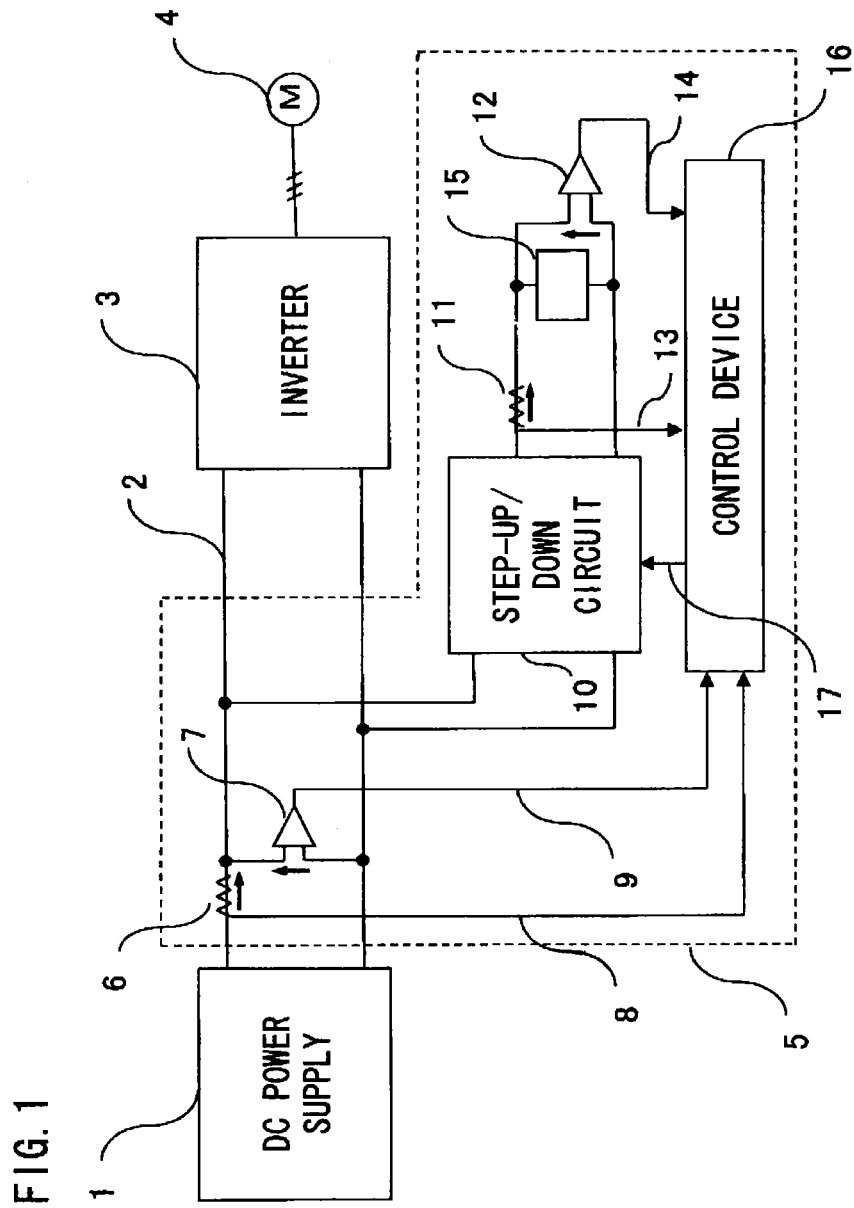
FIG. 1 is a configuration diagram showing the entirety of an AC motor driving apparatus according to Embodiment 1 of the present invention.

FIG. 1 is a configuration diagram showing an AC motor driving apparatus according to Embodiment 1 of the present invention and an AC motor driven by the AC motor driving apparatus.

DC power outputted from a DC power supply 1 is supplied to an inverter 3 via a DC bus bar 2. DC-to-AC power conversion is performed by the inverter 3 to supply appropriate AC power to an AC motor 4. A power compensator 5 is connected in parallel with the DC bus bar 2 which electrically connects the DC power supply 1 to the inverter 3, and mainly includes a step-up/down circuit 10, a power storage device 15, a control device 16, and voltage and current detectors 6, 7, 11, and 12.

As the DC power supply 1, a diode converter or a PWM converter which rectifies AC power from a power supply system is used. For example, in the case where the AC motor 4 is used for driving an electric rolling stock, power supplied from a DC wire is received, and thus the DC wire corresponds to the DC power supply.

Figure 2:
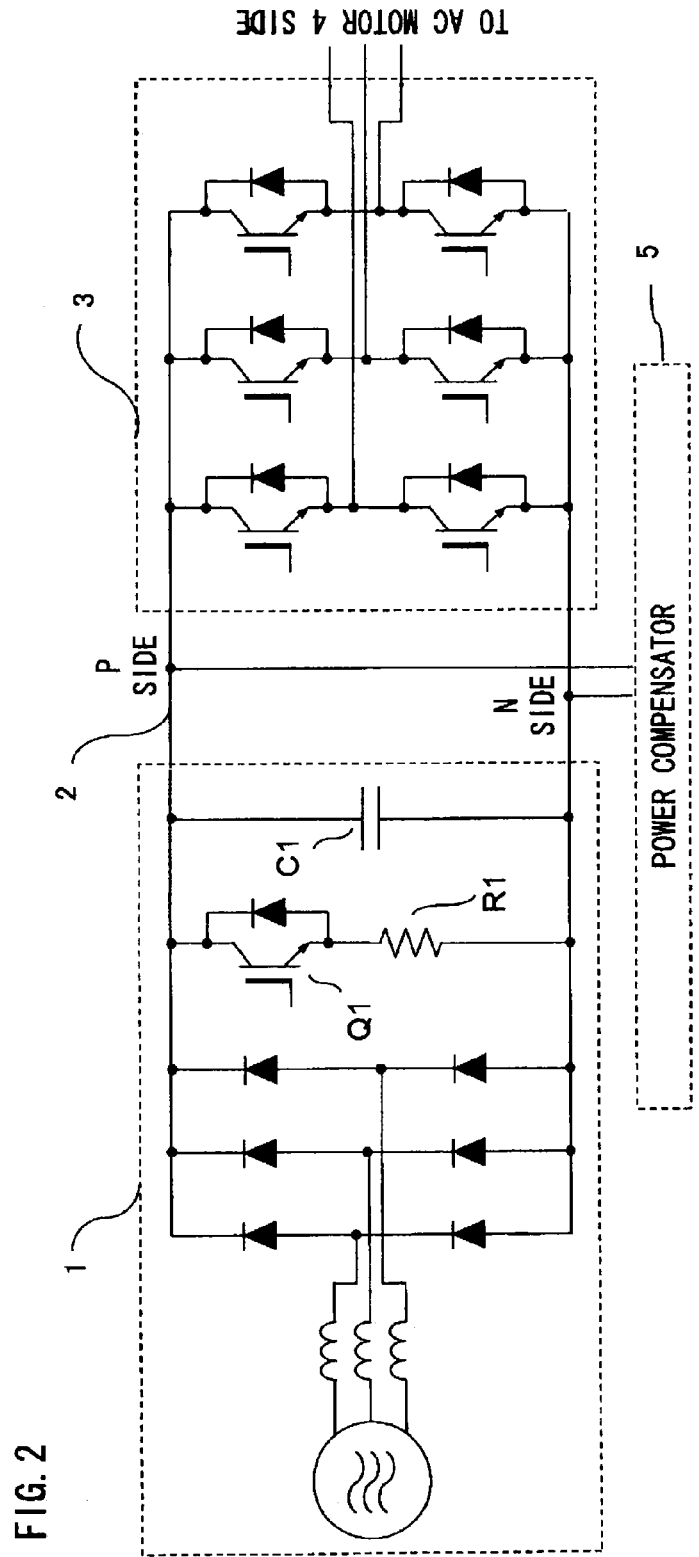
FIG. 2 is a circuit configuration diagram showing a DC power supply and an inverter in the AC motor driving apparatus.
Figure 3:
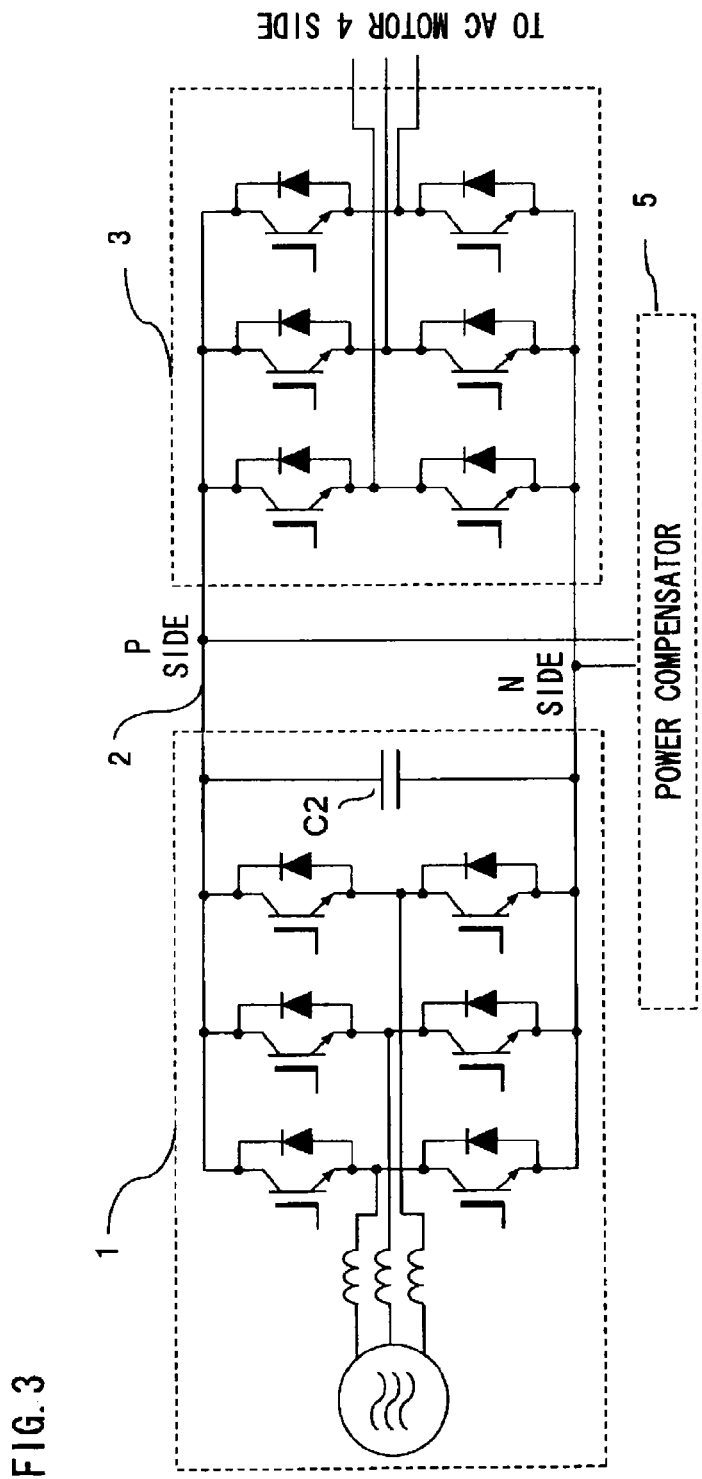
FIG. 3 is a circuit configuration diagram showing other types of a DC power supply and an inverter in the AC motor driving apparatus.

FIG. 2 shows a configuration in the case where the diode converter is used as the DC power supply 1, and FIG. 3 shows a configuration in the case where the PWM converter is used as the DC power supply 1. It is noted that the inverter 3 is also shown together therein. The diode converter shown in FIG. 2 cannot return power to the power supply system side, and thus a resistor R1 for regeneration and a switching device Q1 are provided to process regenerative power that cannot be absorbed by the power compensator 5. In addition, the PWM converter shown in FIG. 3 can control a current flowing to the power supply system and can control power used by itself.

Figure 4:
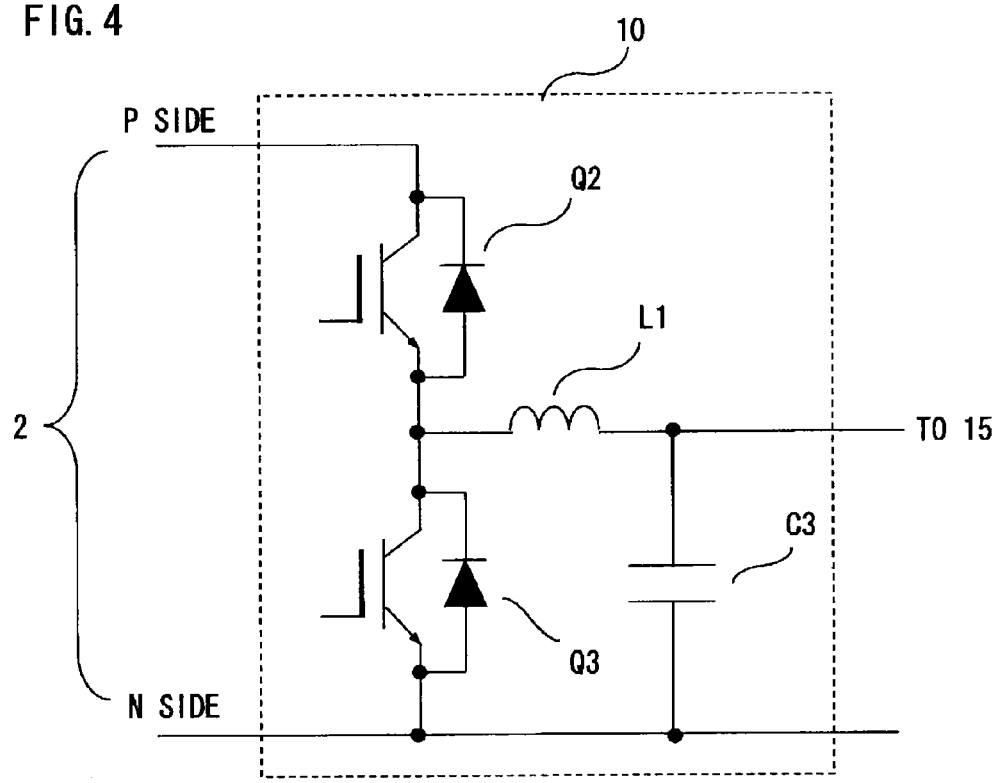
FIG. 4 is a circuit configuration diagram of a step-up/down circuit in the AC motor driving apparatus.
Figure 5:
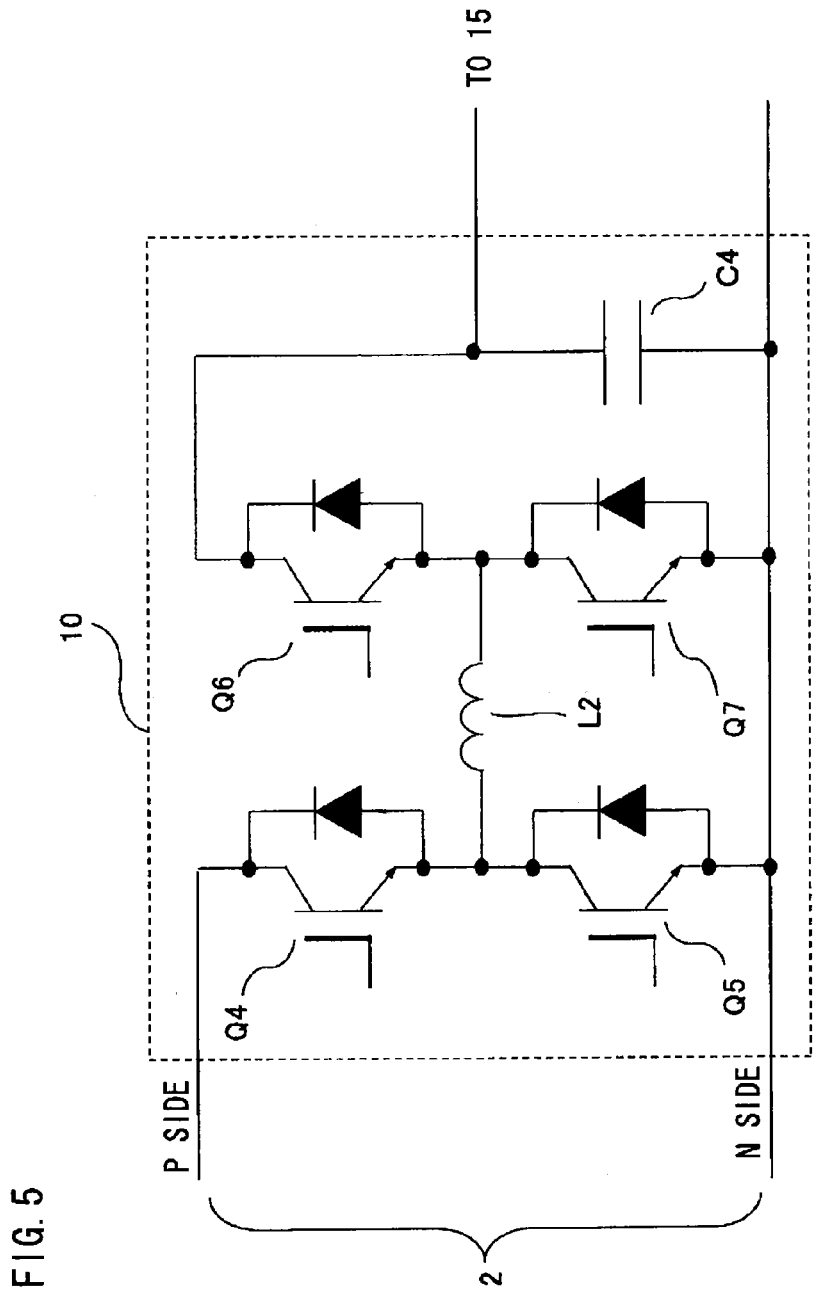
FIG. 5 is a circuit configuration diagram of another type of a step-up/down circuit in the AC motor driving apparatus.

The step-up/down circuit 10 performs voltage level conversion between the DC bus bar 2 and the power storage device 15 to exchange power therebetween. As the step-up/down circuit 10 in this case, there is, for example, a chopper circuit which includes switching devices Q2 and Q3, a reactor L1, and a capacitor C3 for smoothing as shown in FIG. 4, and a step-down operation for the DC bus bar 2 side is performed. In addition, depending on operating conditions and the specifications of the power storage device 15, the voltage of the power storage device 15 may be higher than the voltage of the DC bus bar 2. In such a case, a circuit which includes switching devices Q4 to Q7, a reactor L2, and a capacitor C4 for smoothing and is capable of performing a step-up/down operation as shown in FIG. 5 can be used.

The power storage device 15 stores energy, and capacitors such as an electrolytic capacitor and an electrical double-layer capacitor, batteries such as a lithium ion battery, and the like correspond to the power storage device 15.

The control device 16 outputs a switching instruction 17 for controlling the step-up/down circuit 10, on the basis of information such as voltage and current signals of the DC bus bar 2 and the power storage device 15 which are acquired from the detectors 6, 7, 11, and 12, and discharges power of the power storage device 15 to the DC bus bar 2 side or charges the power storage device 15.

In particular, in Embodiment 1, when the absolute value of the DC power inputted and outputted from the DC power supply 1 to the DC bus bar 2 is equal to or greater than a predetermined value, the control device 16 performs power compensation by the power compensator 5 such that the power inputted and outputted from the DC power supply 1 to the DC bus bar 2 does not exceed a power limit value of the DC power supply 1, namely, an allowable range (hereinafter, this process is referred to as a power compensation process A).

However, only with the power compensation process A, excess/shortage of an amount of power of the power storage device 15 occurs in the case where power demand in the same state such as power running or regeneration is continued. Thus, in addition to the power compensation process A, the control device 16 performs a charging/discharging operation on the power storage device 15 according to need (hereinafter, this process is referred to as a power storage adjustment process B). A range of power that can be supplied by the DC power supply 1 in the case where the power storage adjustment process B is performed is determined by a degree of a power allowance with respect to the power storage device 15 which is based on the difference between a power limit of the DC power supply 1 and required power of the inverter 3 as described in detail later.

Figure 6:
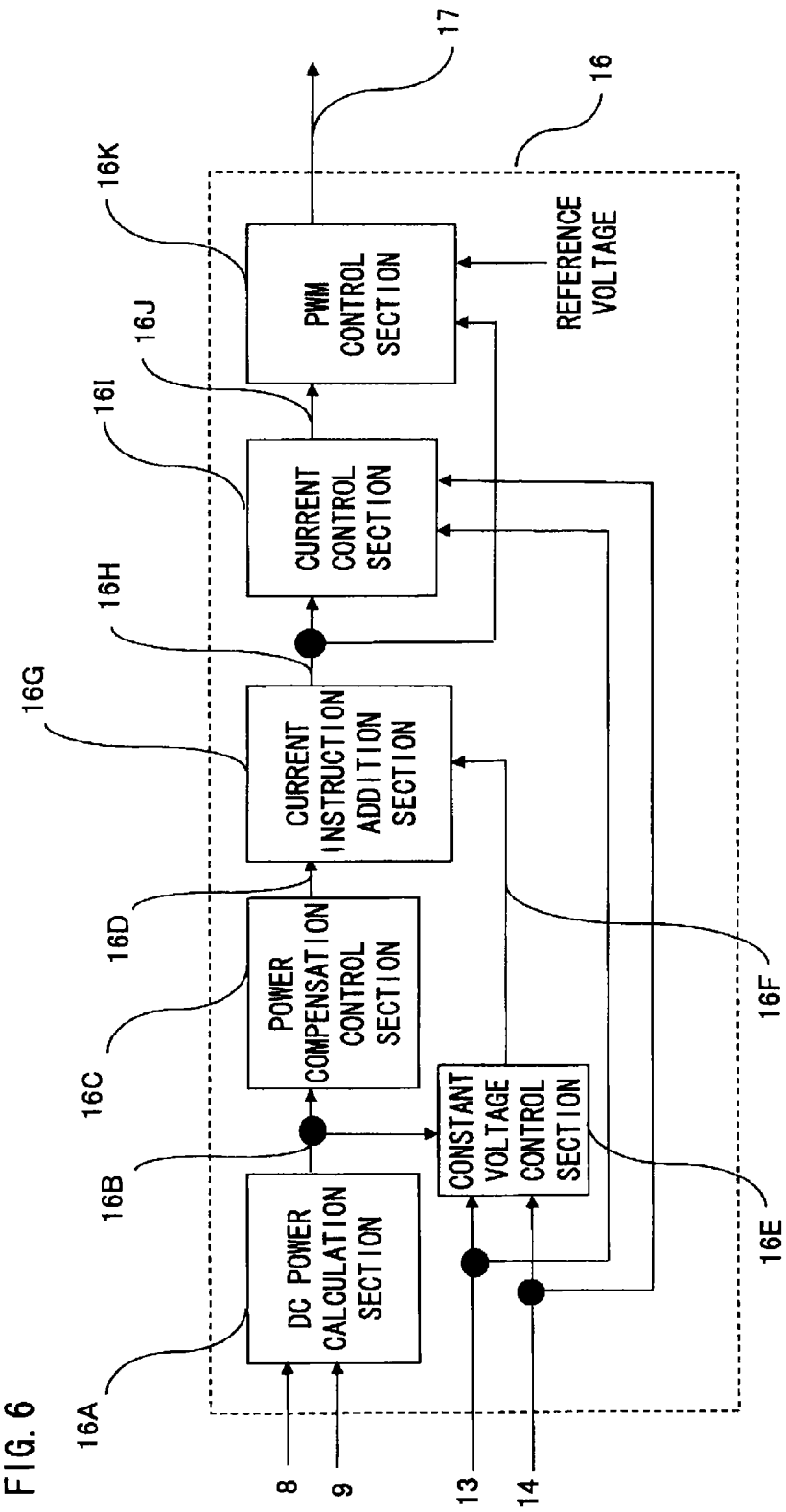
FIG. 6 is a configuration diagram showing a detail of a control device provided in a power compensator of the AC motor driving apparatus.

A specific example of the entire configuration of the control device 16 is shown in FIG. 6.

The control device 16 includes a DC power calculation section 16A, a power compensation control section 16C, a constant voltage control section 16E, a current instruction addition section 16G, a current control section 16I, and a PWM control section 16K.

Here, the DC power calculation section 16A receives an output current (i.e., a DC bus bar current) 8 of the DC power supply 1 and an output voltage (i.e., a DC bus bar voltage) 9 of the DC power supply 1 which are detected by the detectors 6 and 7, and multiplies both 8 and 9 to calculate a DC-power-supply power 16B. In addition, the power compensation control section 16C receives the DC-power-supply power 16B and outputs a current instruction 16D for performing the power compensation process A.

Meanwhile, the constant voltage control section 16E receives the DC-power-supply power 16B obtained by the DC power calculation section 16A and a power-storage-device current 13 and a power-storage-device voltage 14 which are obtained by the detectors 11 and 12, and outputs a current instruction 16F for performing the power storage adjustment process B.

In order that the power compensation process A and the power storage adjustment process B are smoothly performed without interruption, the current instruction addition section 16G adds both current instructions 16D and 16F and outputs the current instruction resulting from the addition, as a current instruction 16H to the power storage device 15.

The current control section 16I outputs a voltage instruction 16J for performing current control such that the power-storage-device current 13 detected by the detector 11 coincides with the current instruction 16H in order that the power storage device 15 is charged and discharged with a required current corresponding to the current instruction 16H.

The PWM processing control section 16K outputs the switching instruction 17 for controlling the voltage of the step-up/down circuit 10, on the basis of the voltage instruction 16J provided from the current control section 16I in order that the power storage device 15 is charged and discharged with a required current. The step-up/down circuit 10 operates on the basis of the switching instruction 17.

Next, the configuration of each section of the control device 16 described above will be described in more detail.

Figure 7:
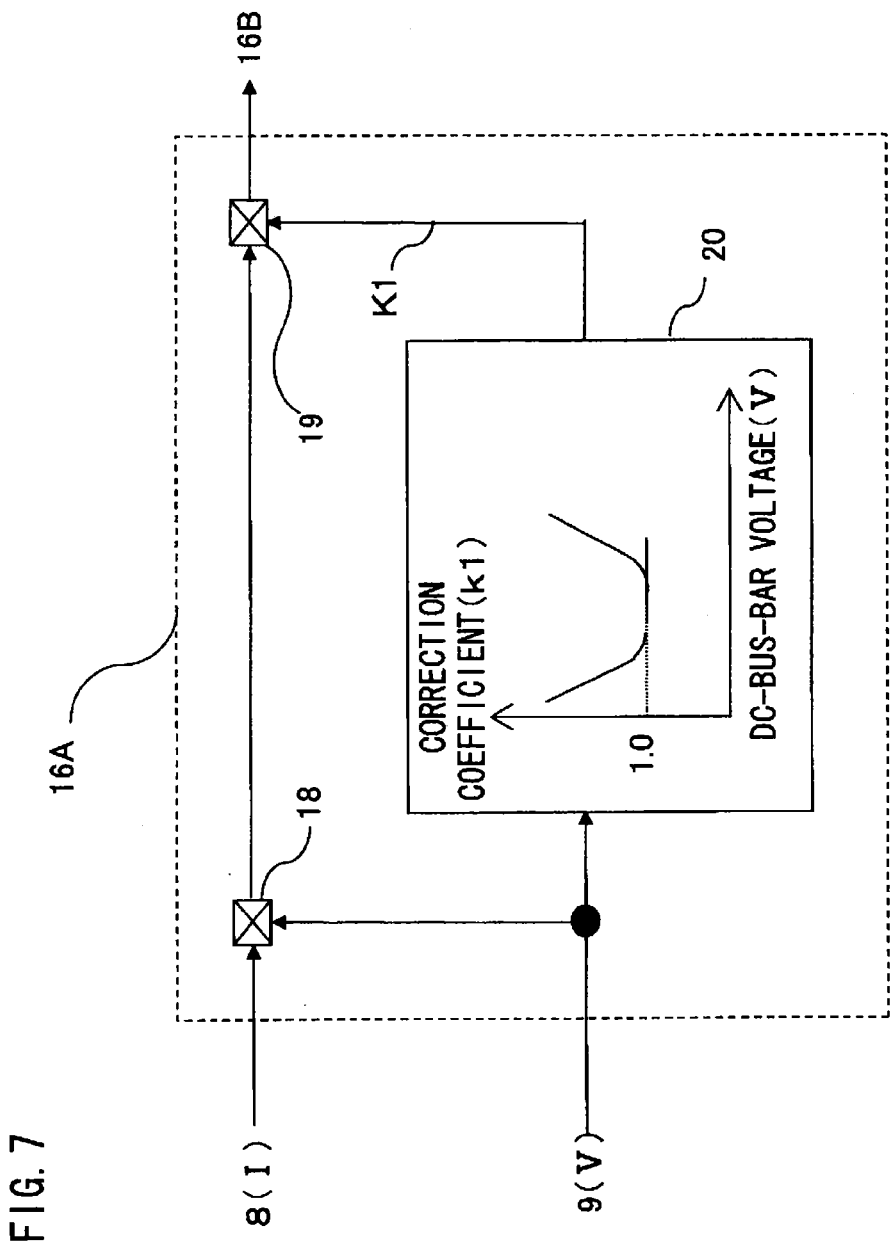
FIG. 7 is a configuration diagram showing a detail of a DC power calculation section included in the control device in FIG. 6.

First, as shown in FIG. 7, the DC power calculation section 16A calculates the product of the DC-bus-bar current 8 and the DC-bus-bar voltage 9, which are detected by the detectors 6 and 7, by a multiplier 18 to obtain the DC-power-supply power 16B, and outputs the DC-power-supply power 16B. It is noted that when the DC-bus-bar voltage 9 is very low, the DC power calculation section 16A corrects the DC-power-supply power 16B by multiplying the DC-power-supply power 16B by a correction coefficient k1 which is previously set in a correction coefficient table 20 and corresponds to the magnitude of the DC-bus-bar voltage 9, by a multiplier 19. This is due to the following reason.

When a load of the AC motor 4 is increased and great power demand occurs for the inverter 3, the DC power supply 1 uses a high current. At that time, when the DC power supply 1 performs an operation of limiting or cutting a used current for protecting itself, the voltage of the DC bus bar 2 varies. For example, in the DC power supply 1 as shown in FIGS. 2 and 3, capacitors C1 and C2 provided on the DC bus bar 2 side are charged and discharged, and the voltage of the DC bus bar 2 varies. The power inputted to and outputted from the DC power supply 1 during a period when the capacitors C1 and C2 are charged and discharged is the same value as the power demand of the inverter 3, but the voltage of the DC bus bar 2 rapidly decreases or rapidly increases due to the above operation. Thus, even though power demand required for power compensation occurs on the AC motor 4 side, an operation of the power compensation process A may not be immediately started. As a result, the responsiveness of the power compensation process A may be deteriorated and appropriate power compensation may not be performed. The correction coefficient table 20 provided in the DC power calculation section 16A is intended to eliminate this, and serves to make the DC-power-supply power 16B apparently great with respect to rapid decrease or increase in the DC-bus-bar voltage 9, thereby causing the power compensation process A to be immediately performed.

Figure 8:
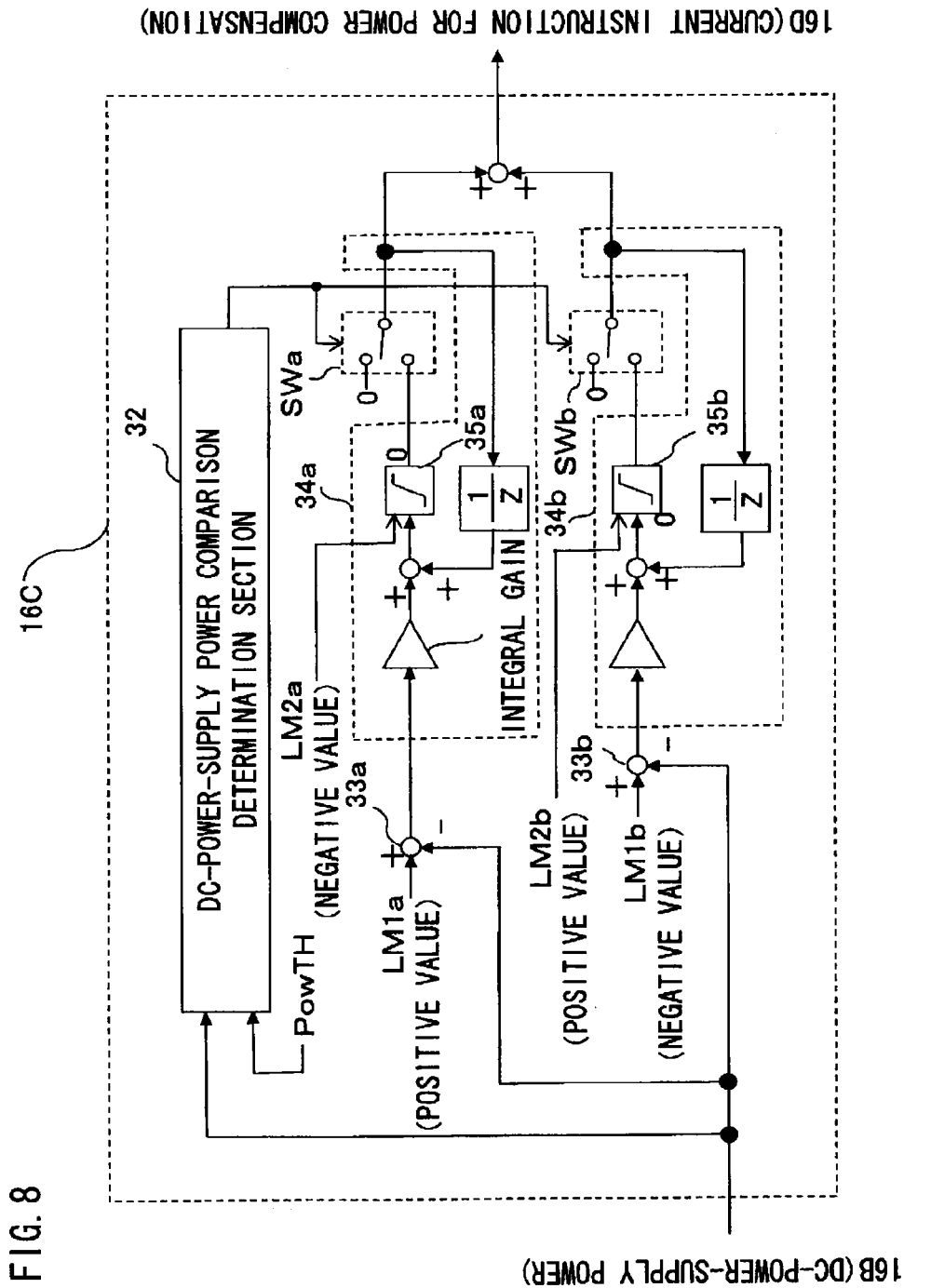
FIG. 8 is a configuration diagram showing a detail of a power compensation control section included in the control device in FIG. 6.

Next, a detailed configuration of the power compensation control section 16C is shown in FIG. 8. It is noted that, here, for convenience of explanation, a positive direction of current/voltage of each section detected within the power compensator 5 is indicated as the direction of an arrow. Therefore, the DC-power-supply power 16B is positive in a power running state. In addition, when the-power-storage device current 13 flows in the positive direction, the power storage device 15 is charged. In other words, the power storage device 15 absorbs power.

The power compensation control section 16C receives the DC-power-supply power 16B obtained by the DC power calculation section 16A, and determines by comparison by a DC-power-supply power comparison determination section 32 whether or not the absolute value of the DC-power-supply power 16B is equal to or greater than a threshold PowTH which is previously set in consideration of a range of DC power that can be supplied by the DC power supply 1.

If the absolute value of the DC-power-supply power 16B is less than the threshold PowTH, the power demand of the AC motor 4 can be met by the DC-power-supply power 16B supplied from the DC power supply 1, and the power compensation process A is unnecessary. Thus, the DC-power-supply power comparison determination section 32 connects each of both switches SWa and SWb to a "0" output side. In other words, the current instruction 16D for the power compensation process A is not outputted.

On the other hand, if the absolute value of the DC-power-supply power 16B is equal to or greater than the threshold PowTH, the power demand of the AC motor 4 cannot be met only by the DC-power-supply power 16B supplied from the DC power supply 1, and the power compensation process A by the power compensator 5 is required. Thus, the DC-power-supply power comparison determination section 32 connects each of the switches SWa and SWb to a loop side in which integrating control is mainly performed.

A DC-power-supply power running power limit LM1$a$ (positive value) and a DC-power-supply regeneration power limit LM1$b$ (negative value), which are upper and lower limits of suppliable power which are determined according to power running and regeneration states and on the basis of the characteristics of the DC power supply 1, are previously set in the power compensation control section 16C. When each of the switches SWa and SWb is connected to the loop side in which integrating control is mainly performed as described above, each of subtractors 33$a$ and 33$b$ of the power compensation control section 16C calculates the difference between the DC-power-supply power running power limit LM1$a$ or the DC-power-supply regeneration power limit LM 1$b$ and the inputted DC-power-supply power 16B, and integrating control is performed by each of integrators 34$a$ and 34$b$ using the difference, and the current instruction 16D to the power storage device 15 is outputted.

In this case, limiters 35$a$ and 35$b$ are provided in the middles of loops of the integrating control of the integrators 34$a$ and 34$b$, respectively. These limiters 35$a$ and 35$b$ are intended to prevent signals from being excessively accumulated in the integrators 34$a$ and 34$b$ when the power compensation process A is unnecessary, and are also intended to suppress the current instruction 16D such that the current instruction 16D falls within a predetermined range in order that a current with which the power storage device 15 is charged/discharged does not exceed a power-storage-device discharging current limit LM2$a$ (negative value) and a power-storage-device charging current limit LM2$b$ (positive value), which are lower and upper limits of a chargeable/dischargeable current which are previously set on the basis of the characteristics of the power storage device 15. In particular, when the operation of the power compensation process A shifts from ON to OFF, the limiters 35$a$ and 35$b$ smoothly attenuate signals accumulated in the integrators 34$a$ and 34$b$ to prevent chattering. In addition, the power storage device 15 includes a battery or a capacitor as described above, and they each have an appropriate temperature range and there is an appropriate power-stored state, namely, an appropriate current recommended by a voltage value of the power storage device 15 for efficiently exchanging electric energy. Thus, in order to use the power storage device 15 in an appropriate state, it is necessary to limit a current during charging/discharging. This is achieved by controlling the current limit values LM2$a$ and LM2$b$ which are set in the limiters 35$a$ and 35$b$, respectively.

It is noted that the threshold PowTH which is previously set in the DC-power-supply power comparison determination section 32 is set to a value that is slightly lower than the absolute value of each of the power running and regeneration power limits LM1$a$ and LM1$b$ of the DC power supply 1. This is because if the threshold PowTH is set to the same value as the absolute value of each of the power running and regeneration power limits LM1$a$ and LM1$b$, chattering occurs in the integrators 34$a$ and 34$b$ before and after the absolute value of the DC-power-supply power 16B becomes equal to the threshold PowTH, and it is necessary to prevent this chattering. In addition, here, the threshold PowTH is set to the same value for both the power running side and the regeneration side, but different thresholds may be set therefor. For example, in the case where the DC power supply 1 is the diode converter shown in FIG. 2, regenerative power is consumed by the resistor R1. Thus, a processable amount thereof is often smaller than that of power running power, and the threshold PowTH is set to different values for the power running side and the regeneration side.

Figure 9:
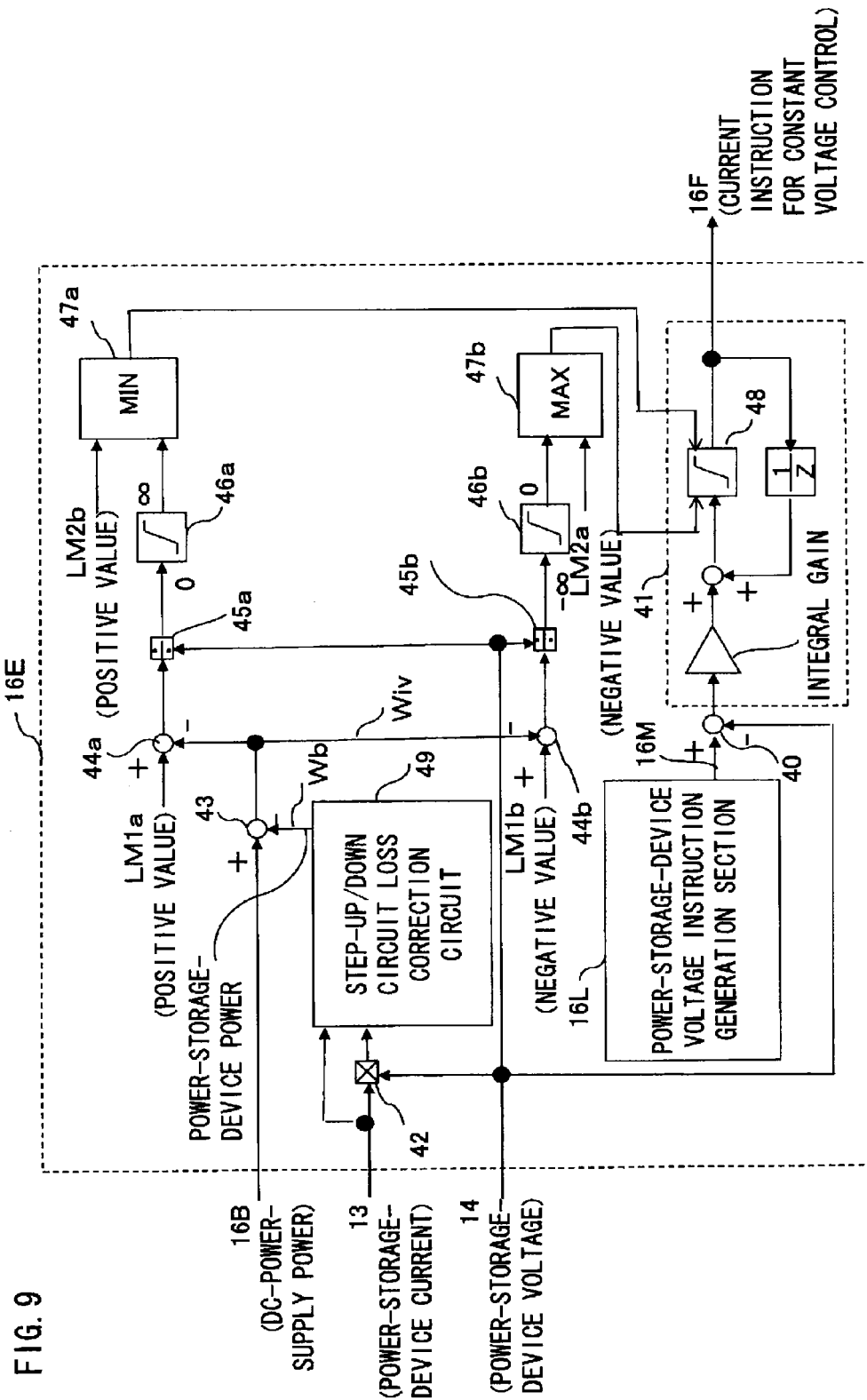
FIG. 9 is a configuration diagram showing a detail of a constant voltage control section included in the control device in FIG. 6.

Next, a detailed configuration of the constant voltage control section 16E is shown in FIG. 9.

The constant voltage control section 16E calculates the current instruction 16F for performing the power storage adjustment process B. Specifically, in order that the voltage of the power storage device 15 becomes a predetermined value, the constant voltage control section 16E calculates, by a subtractor 40, the difference between the power-storage-device voltage 14 detected by the detector 12 at the present time and a voltage instruction 16M which is a control target value of a power storage voltage for the power storage device 15 and is provided from a power-storage-device voltage instruction generation section 16L, and performs integrating control by an integrator 41 using the difference, to obtain the current instruction 16F for performing constant voltage control on the power storage device 15. In the integrating control by the integrator 41, it is necessary to apply, to the power storage device 15, power within a range of power that can be used by the DC power supply 1, namely, within a range where there is a power allowance in the DC power supply 1. Thus, it is necessary to provide, to the integrator 41, a current limit which defines a limit corresponding to the power allowance of the DC power supply 1.

Therefore, first, the power allowance of the DC power supply 1 is calculated. For this, an inverter power Wiv is obtained by calculating, by a subtractor 43, the difference (=16B−Wb) between the above DC-power-supply power 16B obtained by the DC power calculation section 16A and a power-storage-device power Wb obtained by multiplying the power-storage-device current 13 and the power-storage-device voltage 14, which are obtained by the detectors 11 and 12, by a multiplier 42. Next, the differences between the inverter power Wiv and the above DC-power-supply power running power limit LM1$a$ (positive value) and DC-power-supply regeneration power limit LM1$b$ (negative value), which are the upper and lower limits of suppliable power determined according to the power running and regeneration states of the DC power supply 1, are calculated by subtractors 44$a$ and 44$b$, respectively. The reason why the power Wiv of the inverter 3 is used is that the power of the DC power supply 1 varies in response to the operation of the constant voltage control section 16E itself and thus cannot be directly identified only by detection of the DC-power-supply power 16B. Then, each of the power differences obtained by the subtractors 44a and 44b becomes the power allowance of the DC power supply 1. Next, each power difference is divided by the power-storage-device voltage 14 by a divider 45a or 45b to obtain a current limit corresponding to the power allowance of the DC power supply 1.

Limiters 46a and 46b provided at stages immediately after the divisions by the dividers 45a and 45b are intended to prevent interference with the power compensation process A. For example, when the power difference obtained by the subtractor 44a is negative, the inverter power Wiv required by the inverter 3 exceeds the supply capacity of the DC power supply 1 and there is no power allowance, and therefore, it is in a state where the power compensation process A should be performed, not in a state where the power storage adjustment process B should be performed. Thus, when the power difference obtained by the subtractor 44a is negative, output is eliminated by the limiter 46a. The same applies to the case of the regeneration state.

Through the above process, the current limits for the power storage device 15 corresponding to the power allowance of the DC power supply 1 are obtained. The current limits should not exceed the above power-storage-device discharging current limit LM2a (negative value) and power-storage-device charging current limit LM2b (positive value), which are determined on the basis of the characteristics of the power storage device 15, and thus the current limit whose absolute value is smaller is selected by selection circuits 47a and 47b. The current limit selected by the selection circuits 47a and 47b is provided to a limiter 48 provided in the middle of a loop of the integrating control of the integrator 41, whereby the current limit corresponding to the power allowance of the DC power supply 1 is provided to the integrator 41.

With such a configuration, the power storage adjustment process B can be performed without disturbing the power compensation process A. In other words, the power compensation process A can be preferentially performed. Furthermore, the power storage adjustment process B can be performed within the range of the power allowance of the DC power supply 1, and it is also possible to use the inverter power Wiv.

Here, for reducing the number of current detectors, the inverter power Wiv is calculated from the DC-power-supply power 16B and the power-storage-device power Wb by using the subtractor 43. In addition, power from the power storage device 15 has loss by the step-up/down circuit 10, and thus loss correction is performed by a provided step-up/down circuit loss correction circuit 49 for deriving the inverter power Wiv. It is noted that since it is only necessary to be able to calculate the inverter power Wiv, a current detector may be provided on the input side of the inverter 3 and the inverter power Wiv may be obtained by multiplication with the DC bus bar 2. In addition, although depending on an operating state or a purpose, if the voltage instruction 16M for the power storage device 15 in the power-storage-device voltage instruction generation section 16L is a rated voltage Vf of the power storage device 15, power compensation can be performed emphasizing power compensation in power running.

It is noted that as the power running and regeneration power limit values LM1a and LM1b of the DC power supply 1 described with reference to FIGS. 8 and 9, predetermined rated power values are used in the case where the DC power supply 1 is the diode converter shown in FIG. 2. In addition, in the case where the DC power supply 1 is the PWM converter shown in FIG. 3, for the operations of the power compensation control section 16C and the constant voltage control section 16E shown in FIGS. 8 and 9, the power running and regeneration power limit values LM1a and LM1b are previously set to values slightly lower than the predetermined rated power values, or a power limit value of the PWM converter itself is previously set to a value slightly higher than a predetermined rated value. This becomes a measure for normally performing the processes shown in FIGS. 8 and 9, because the PWM converter can control and limit power by itself.

Next, a series of operations associated with the power compensation process A in the case where the power storage adjustment process B is performed in the power compensation control section 16C will be described with reference to FIG. 10.

As shown in FIG. 10(a), the inverter power Wiv changes with time. In this case, the difference W1 between the inverter power Wiv and the DC-power-supply power running power limit LM1a becomes a power allowance Ma which can be used for the power storage adjustment process B in a direction in which the power storage device 15 is charged as shown in FIG. 10(b). In addition, the difference W2 between the inverter power Wiv and the DC-power-supply regeneration power limit LM1b becomes a power allowance Mb which can be used for the power storage adjustment process B in a direction in which the power storage device 15 is discharged as shown in FIG. 10(b).

Figure 10:
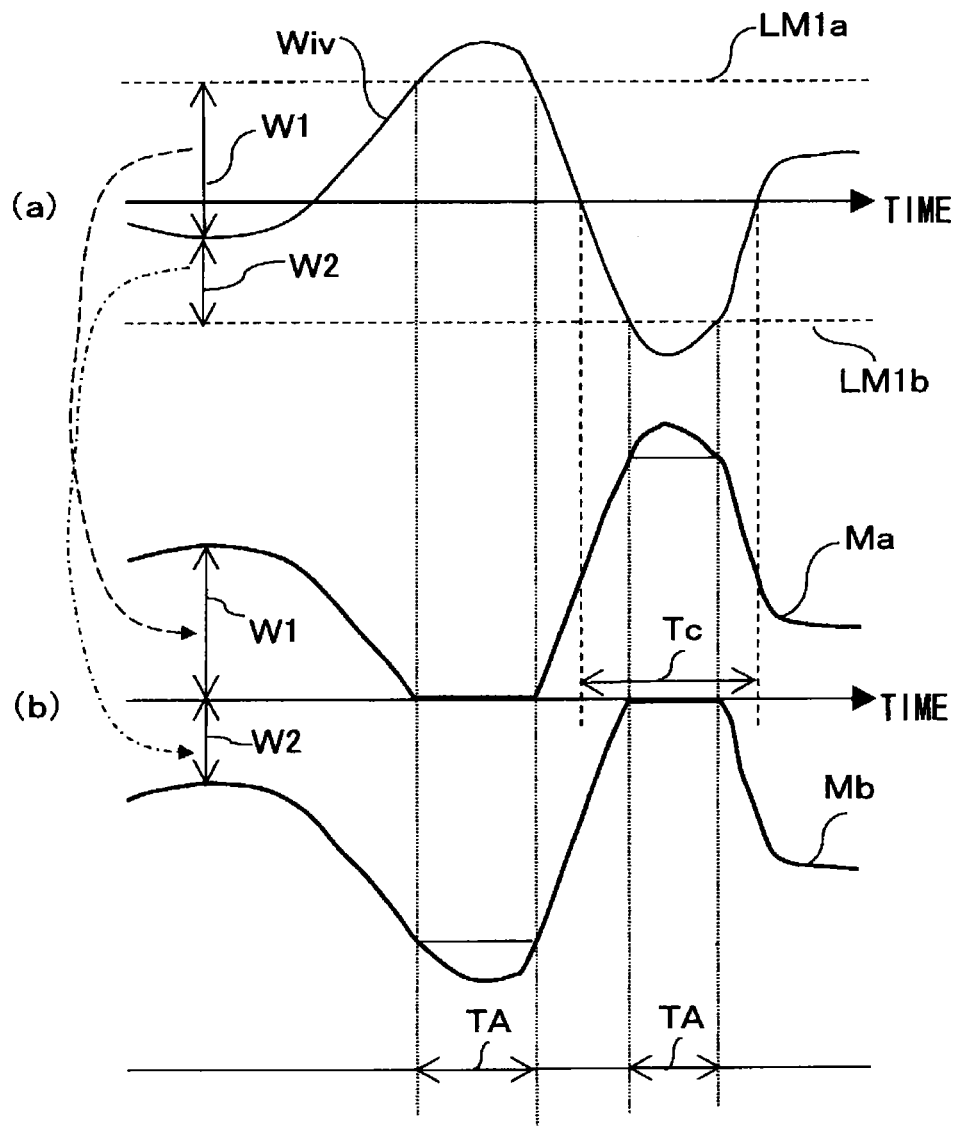
FIG. 10 is a time chart showing a series of operations associated with a power compensation process A in the case where a power storage adjustment process B is performed in the power compensation control section included in the control device in FIG. 6.

Each period indicated by a reference character TA in FIG. 10 is a period when the inverter power Wiv exceeds the absolute value of each of the power running and regeneration power limit values LM1a and LM1b of the DC power supply 1, and is a state where the power compensation control section 16C operates. In this case, although the power compensation process A and the power storage adjustment process B are different in priority from each other, the operations of both processes A and B are possible at the same time depending on the direction of power.

For example, in the period indicated by Tc in FIG. 10, it is in a regeneration state where power returns from the inverter 3, and the power compensation process A is included, in addition the power storage adjustment process B in a direction in which the power storage device 15 is charged can be performed at the same time. The power compensation process A and the power storage adjustment process B may be exclusively performed with reference to the power allowance of the DC power supply 1. However, when the power storage adjustment process B described above is caused to be always performed and a process of adjusting the current instruction 16F in the power storage adjustment process B by the limiter 48 is performed, the voltage of the power storage device 15 can be quickly shifted to a predetermined value which is a target.

Figure 11:
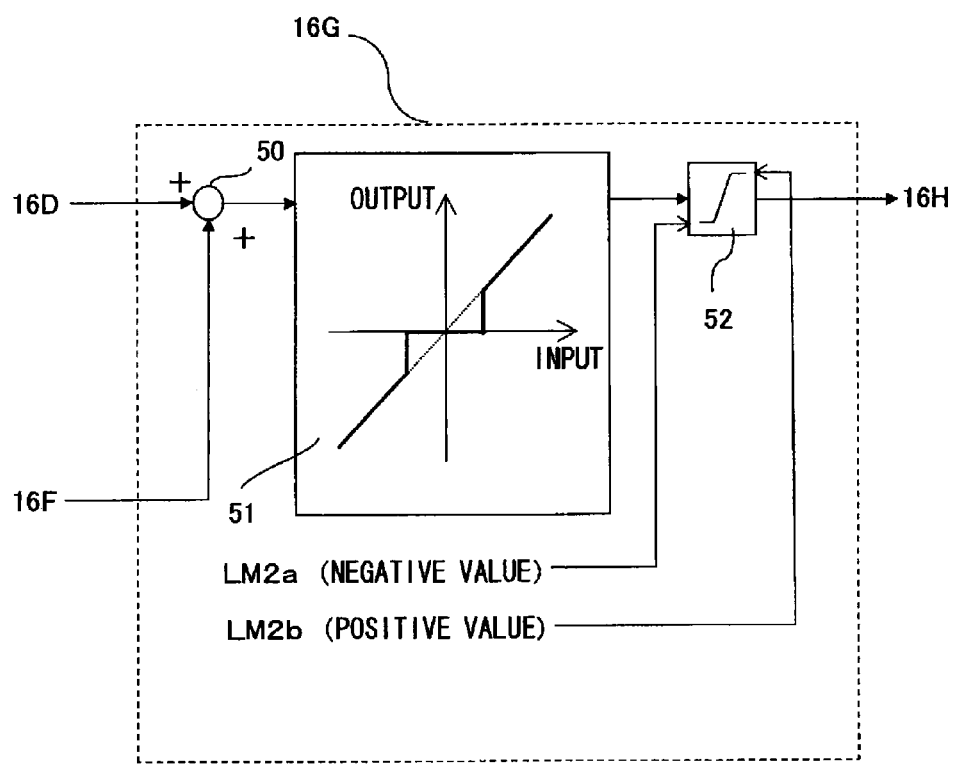
FIG. 11 is a configuration diagram showing a detail of a current instruction addition section included in the control device in FIG. 6.

Next, a detailed configuration of the current instruction addition section 16G is shown in FIG. 11.

In order that the power compensation process A and the power storage adjustment process B are smoothly performed without interruption, the current instruction addition section 16G adds, by an adder 50, the current instruction 16D for the power storage device 15 provided from the power compensation control section 16C and the current instruction 16F for power-storage-device constant voltage control provided from the constant voltage control section 16E. When the current instruction 16H obtained thus is a minute value, the current of the power storage device 15 may tend to be in a hunting state due to the process of the current control section 16I at the subsequent stage. Thus, when the current instruction is minute, a process of forcibly clamping the current instruction 16H to "0" is performed by a clamping process section 51 provided within the current instruction addition section 16G. In addition, the current instruction 16H for the power storage device 15 is limited by a provided limiter 52 so as to not exceed each of the current limits LM2a and LM2b of a charging/discharging current allowable for the power storage device 15, and then is outputted.

Figure 12:
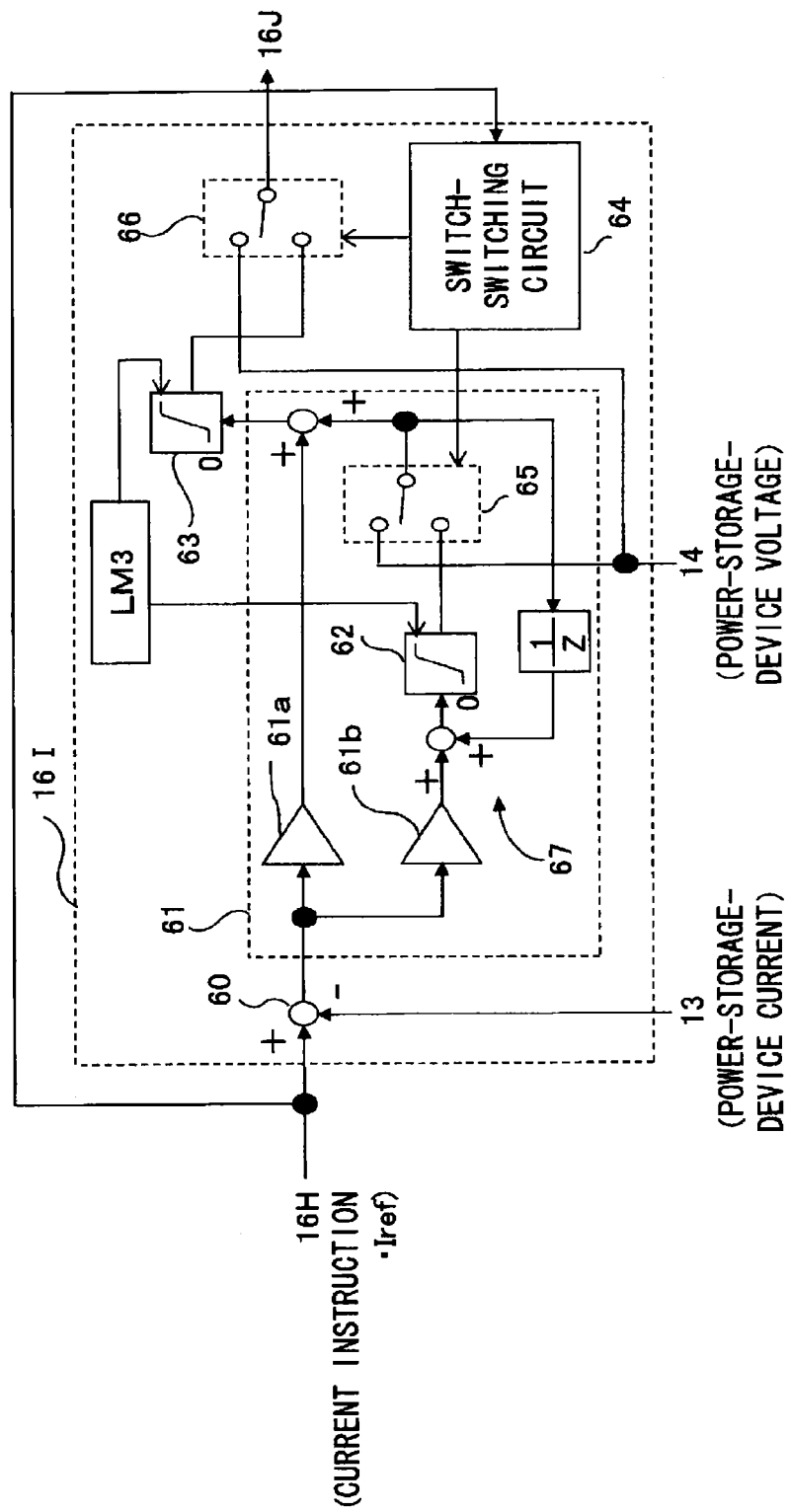
FIG. 12 is a configuration diagram showing a detail of a current control section included in the control device in FIG. 6.

Next, a detailed configuration of the current control section 16I is shown in FIG. 12.

The current instruction 16H for the power storage device 15 obtained by the current instruction addition section 16G is inputted to the current control section 16I. Then, the current control section 16I calculates, by a subtractor 60, the difference between the current instruction 16H and the power-storage-device current 13 detected by the detector 11, performs PI control by a PI control section 61 on the basis of the difference, and calculates the voltage instruction 16J for the step-up/down circuit 10. At that time, application of an excessive voltage to the power storage device 15 is prevented by voltage limiters 62 and 63 which are provided in the middle of a control loop of the PI control section 61 and on the output side of the PI control section 61, respectively, and which limit a voltage applied to the power storage device 15 such that the voltage does not exceed a power-storage-device voltage limit LM3 which is an upper limit of a voltage applicable to the power storage device 15. By the voltage limiters 62 and 63, a process can be realized which smoothly shifts from constant current charging/discharging to constant voltage charging/discharging. It is noted that in the PI control section 61 in FIG. 12, 61a indicates a proportional gain, and 61b indicates an integral gain.

In FIG. 12, the lower limits of the voltage limiters 62 and 63 are set to "0", but may be set as appropriate according to the type, the state (SOC), or the like of the power storage device 15 in a state which is not during initial charging. In addition, when the current instruction 16H is "0", none of the processing operations of the power compensation process A and the power storage adjustment process B is performed, switches 65 and 66 are switched by a switch-switching circuit 64, and the power-storage-device voltage 14 is selectively outputted instead of output of an integrator 67 within the PI control section 61 and the output of the voltage instruction 16J. Thus, an effect is provided that a current control operation can be performed immediately when a next current instruction for charging/discharging the power storage device 15 is issued.

Next, the PWM control section 16K will be described in detail.

The PWM control section 16K calculates a duty ranging from "0" to "1" according to the current instruction 16H provided from the current instruction addition section 16G, the voltage instruction 16J provided from the current control section 16I, and a reference voltage, and performs a PWM process by carrier comparison. Here, the reference voltage is the DC-bus-bar voltage 9. In this case, each of the switching devices on the P side and the N side constituting the step-up/down circuit 10 may be operated in a complementary manner, or, for example, when the current instruction 16H for the power storage device 15 is positive, the switching device on the N side may always output an OFF instruction. Thus, the driving circuit of the switching device to be turned off can be stopped, leading to reduction of power loss. In addition, it is not necessary to provide a dead time for preventing short circuit, and a controllable voltage range can be expanded. It is noted that when the voltage instruction 16J provided from the current control section 16I is zero, the PWM control section 16K outputs an instruction to turn off both of the switching devices on the P side and the N side of the step-up/down circuit 10.

Figure 13:
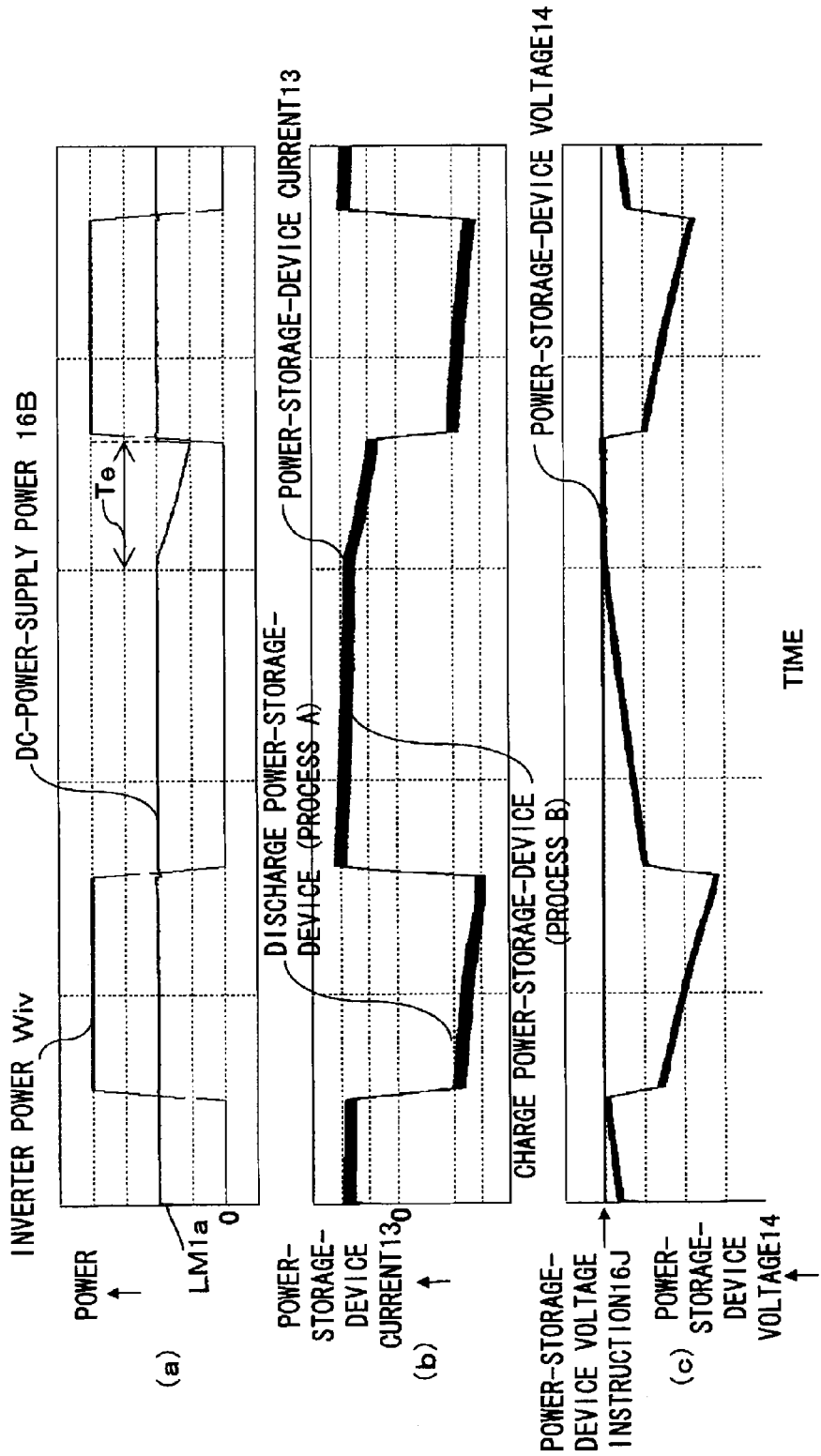
FIG. 13 is a time chart showing an example of operation explanation of the power compensation process A and the power storage adjustment process B during power running of an AC motor in the power compensator in Embodiment 1 of the present invention.

With regard to the control device 16 of the power compensator 5 which has the above configuration and operation, an example of the power compensation process A and the power storage adjustment process B during power running of the AC motor 4 is shown in FIG. 13. Here, FIG. 13(a) shows a relationship between the inverter power Wiv and the DC-power-supply power 16B. FIG. 13(b) shows the power-storage-device current 13, and FIG. 13(c) shows the power-storage-device voltage 14.

With occurrence of power demand of the inverter 3, an operation of the power compensation process A is started. Thus, as shown in FIG. 13(b), the power-storage-device current 13 flows in the negative direction and discharging is performed. Here, when the power storage adjustment process B is not performed and power demand repeatedly occurs, an amount of power stored in the power storage device 15 is gradually lost, and the power compensation process A is finally disenabled. On the other hand, in Embodiment 1, after the operation of the power compensation process A ends, an operation of the power storage adjustment process B is mainly performed, and an operation of charging the power storage device 15 is performed. Thus, next power demand of the inverter 3 can also be dealt with. It is noted that as shown in FIG. 13, during operation of the power storage adjustment process B, the DC-power-supply power 16B is substantially equal to or less than the DC-power-supply power running power limit LM1a.

As described above, in the AC motor driving apparatus according to Embodiment 1, for example, when the control device 16 within the power compensator 5 is configured as shown in FIG. 6, the power compensation process A and the power storage adjustment process B can be smoothly performed for the power demand required by the inverter 3 without interfering with each other, and the power of the DC power supply 1 does not greatly exceed the power limit values LM1a and LM1b. Therefore, even when the AC motor 4 is included in an apparatus such as a working machine, an electric press, and an injection molding machine and is required to operate at high output for a short time, the AC motor 4 can be effectively used.

In addition, as described above, in the power storage adjustment process B, an operation of charging/discharging the power storage device 15 with a constant voltage is performed by using the power allowance of the DC power supply 1. Thus, the power storage device 15 can be charged/discharged without interfering with the operation of the power compensation process A. As a result, even when power demand in the same direction such as in power running or in regeneration occurs in the inverter 3, appropriate compensation is possible. In particular, this is very effective for the case where a power running load relatively frequently occurs, such as for a fan, a pump, or a working machine which performs cutting.

Embodiment 2

Figure 14:
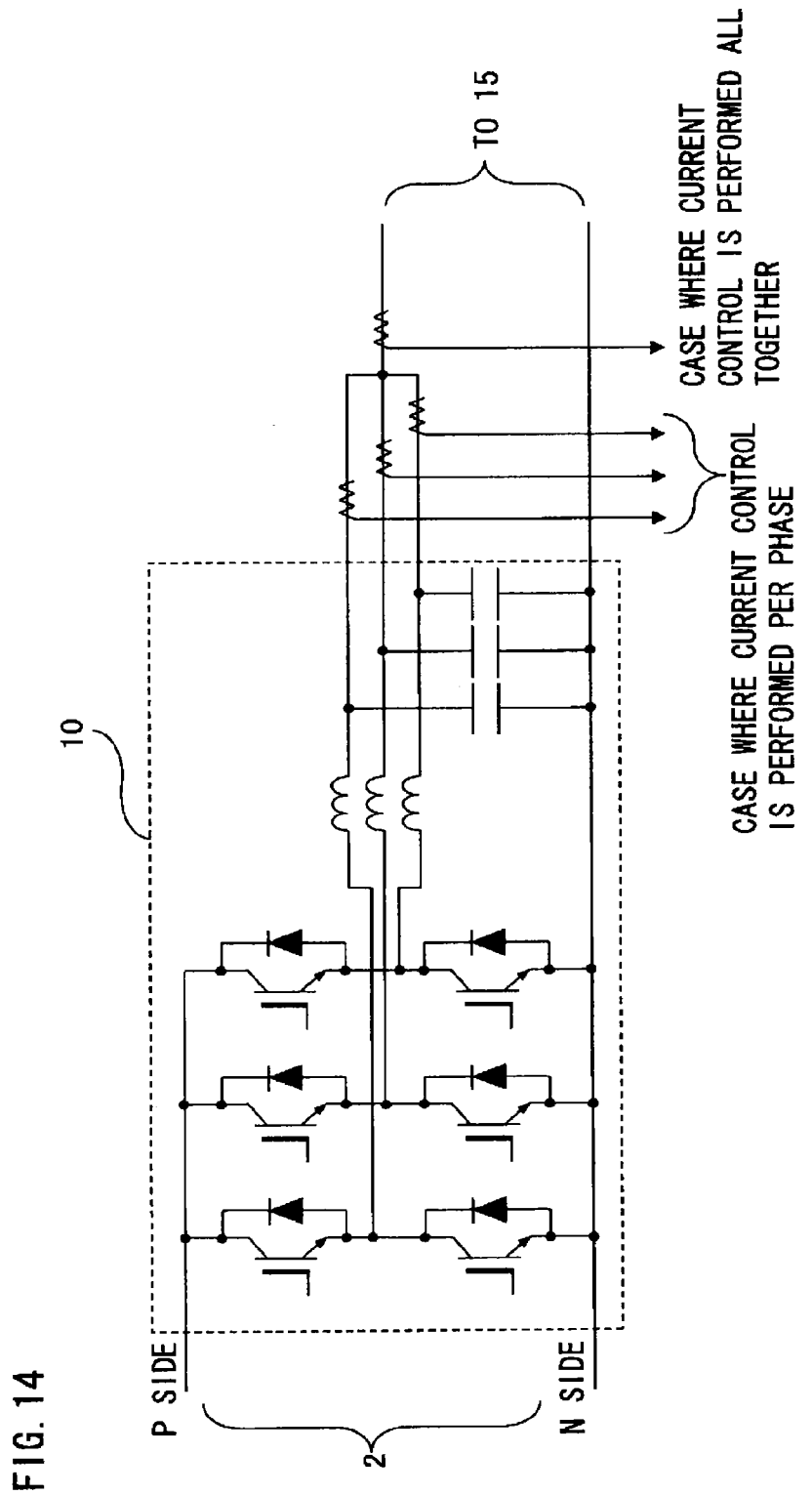
FIG. 14 is a circuit configuration diagram of a step-up/down circuit in an AC motor driving apparatus according to Embodiment 2 of the present invention.

In the power compensator 5 of the AC motor driving apparatus according to Embodiment 1 described above, the circuit shown in FIG. 4 or 5 is shown as an example of the step-up/down circuit 10 which performs voltage level conversion. However, depending on the specifications of the power storage device 15, it is necessary to suppress a flowing-in current ripple. Thus, for example, a multiplex circuit (here, a three-phase circuit) shown in FIG. 14 can be used.

In this case, switching devices in a circuit of each multiplexed phase may be operated according to the same switching instruction 17. In addition, when the current instruction 16H is equally divided and the current control section 16I and the PWM control section 16K are provided in each multiplexed phase, currents of the multiplexed phases are equalized. In this case, when the phase of a carrier signal used for generating the switching instruction 17 is shifted, an effect of further reducing the current ripple is obtained. For example, in the three-phase circuit shown in FIG. 14, the phase is shifted by 360 degrees/3=120 degrees steps.

Embodiment 3

In the power compensator 5 of the AC motor driving apparatus according to Embodiment 1 described above, in the power storage adjustment process B in which the control device 16 controls the voltage of the power storage device 15 to a constant voltage, the voltage instruction 16M corresponding to the rated voltage Vf is used as the control target value of the power storage voltage for the power storage device 15. When the power required by the inverter 3 is previously recognized, a power pattern representing power change can be previously registered in a storage unit, such as a nonvolatile semiconductor memory, provided in the constant voltage control section 16E within the control device 16.

Figure 15:
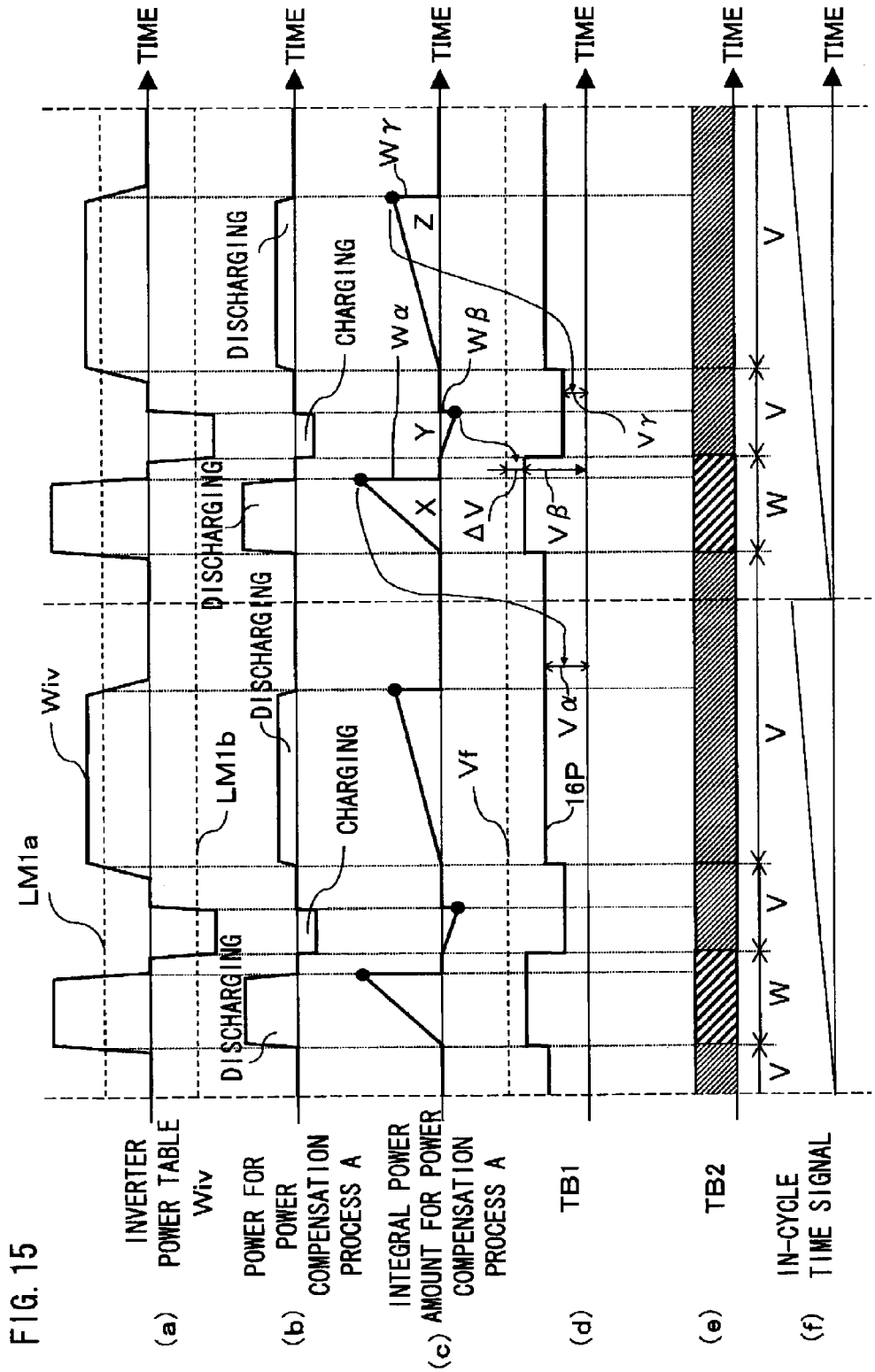
FIG. 15 is a time chart for illustrating a voltage instruction setting operation for a power storage device by a power compensator included in an AC motor driving apparatus according to Embodiment 3 of the present invention.

FIG. 15 is a time chart for illustrating a voltage instruction setting operation for the power storage device 15. In this example, the inverter power Wiv is repeated in a specific pattern in constant cycles as shown in FIG. 15(a).

Here, by comparing the inverter power Wiv to the power running and regeneration power limit values LM1a and LM1b of the DC power supply 1, power (instantaneous value) patterns required for the power compensation process A are obtained as shown in FIG. 15(b). They are a combination of sequences of charging/discharging the power storage device 15. When integration is performed for each sequence, an amount of power which should be discharged or absorbed by the power storage device 15 is recognized as shown in FIG. 15(c). In FIG. 15(c), a value indicated by each black circle corresponds to the maximum value of the integral power amount.

The amount of power stored in the power storage device 15 and the voltage of the power storage device 15 correspond to each other in a one-to-one relation. Therefore, the amount of stored power can be converted into a voltage which should be kept, according to the characteristics of the battery or the capacitor constituting the power storage device 15. Thus, when power demand occurs on the power running side in the inverter 3 and power is discharged from the power storage device 15, a voltage instruction for the power storage device 15 can be determined from an amount of the power to be discharged. On the other hand, when power demand occurs on the regeneration side in the inverter 3 and power is absorbed by the power storage device 15, a voltage instruction for the power storage device 15 can be determined so as to ensure room for absorbing an amount of the power to be absorbed.

In this case, at a stage prior to start of the power compensation process A and the power storage adjustment process B, the amount of power of the power storage device 15 needs to be previously adjusted so as to be in a chargeable or dischargeable state. For example, in the drawing of FIG. 15(c), reference characters X and Z indicate sequences for the power compensation process A during power running, and a reference character Y indicates a sequence for the power compensation process A during regeneration. In this case, for example, when focusing on the single sequence Z, a voltage instruction for the power storage device 15 in the sequence Z is previously set in an interval from the time of start of the sequence Y to the time immediately before start of the sequence Z. As described in above Embodiment 1, the power compensation process A is performed preferentially over the power storage adjustment process B. Thus, the voltage instruction for the power storage device 15 in the sequence Z does not become interference for the sequence Y. When the inverter power Wiv periodically changes in the specific pattern as described above, a result of obtaining a series of voltage instructions for the power storage device 15 provides a power-storage-device voltage instruction table TB1 shown in FIG. 15(d).

Here, for example, the sequence X is power demand during power running as described above, and the power storage device 15 is discharged by the power compensation process A. At that time, it is necessary to previously ensure an amount of power Wα of the power storage device 15 in a state where power compensation is possible, in other words, at a stage prior to start of the sequence X, the power-storage-device voltage 14 needs to be previously adjusted so as to be equal to or higher than a voltage instruction 16P (a value indicated by a reference character Vα in FIG. 15) designated by the power-storage-device voltage instruction table TB1.

In this case, the actual power-storage-device voltage 14 is already sufficiently higher than the above voltage instruction 16P (Vα) at the stage prior to the sequence X, a wasteful discharge operation is performed for adjusting the power-storage-device voltage 14 to the voltage instruction 16P (Vα). In order to prevent this, as shown in FIG. 15(e), a power-storage-device voltage instruction state transition table TB2 is provided, and interval information representing required transition of each of states V and W is previously stored therein such that it is recognized by the power-storage-device voltage instruction state transition table TB2 whether the power-storage-device voltage 14 needs to be in a state of being higher than or in a state of being lower than the voltage instruction 16P designated by the power-storage-device voltage instruction table TB1.

Thus, in an interval of the V state indicated by the power-storage-device voltage instruction state transition table TB2, it can be recognized that the power storage device voltage 14 needs to be in a state of being equal to or higher than the voltage instruction 16P (Vα) designated by the power-storage-device voltage instruction table TB1.

In addition, the sequence Y is power demand during regeneration, and the power storage device 15 is charged by the power compensation process A. At that time, an amount of power Wβ of the power storage device 15 needs to be previously ensured in a state where power compensation is possible. In other words, at a stage prior to start of the sequence Y, adjustment needs to be previously performed such that the power-storage-device voltage 14 is equal to or lower than the voltage instruction 16P (a value indicated by a reference character Vβ in FIG. 15) designated by the power-storage-device voltage instruction table TB1, namely, such that a voltage difference is ensured which is equal to or greater than the voltage difference ΔV between the rated voltage Vf of the power storage device 15 and the voltage instruction 16P (Vβ) designated by the power-storage-device voltage instruction table TB1. Therefore, in this case as well, by using the power-storage-device voltage instruction state transition table TB2, it can be recognized, in an interval of the state of the reference character W indicated in the power-storage-device voltage instruction state transition table TB2, whether the power-storage-device voltage 14 needs to be in a state of being equal to or lower than the voltage instruction 16P (Vβ) designated by the power-storage-device voltage instruction table TB1.

Figure 16:
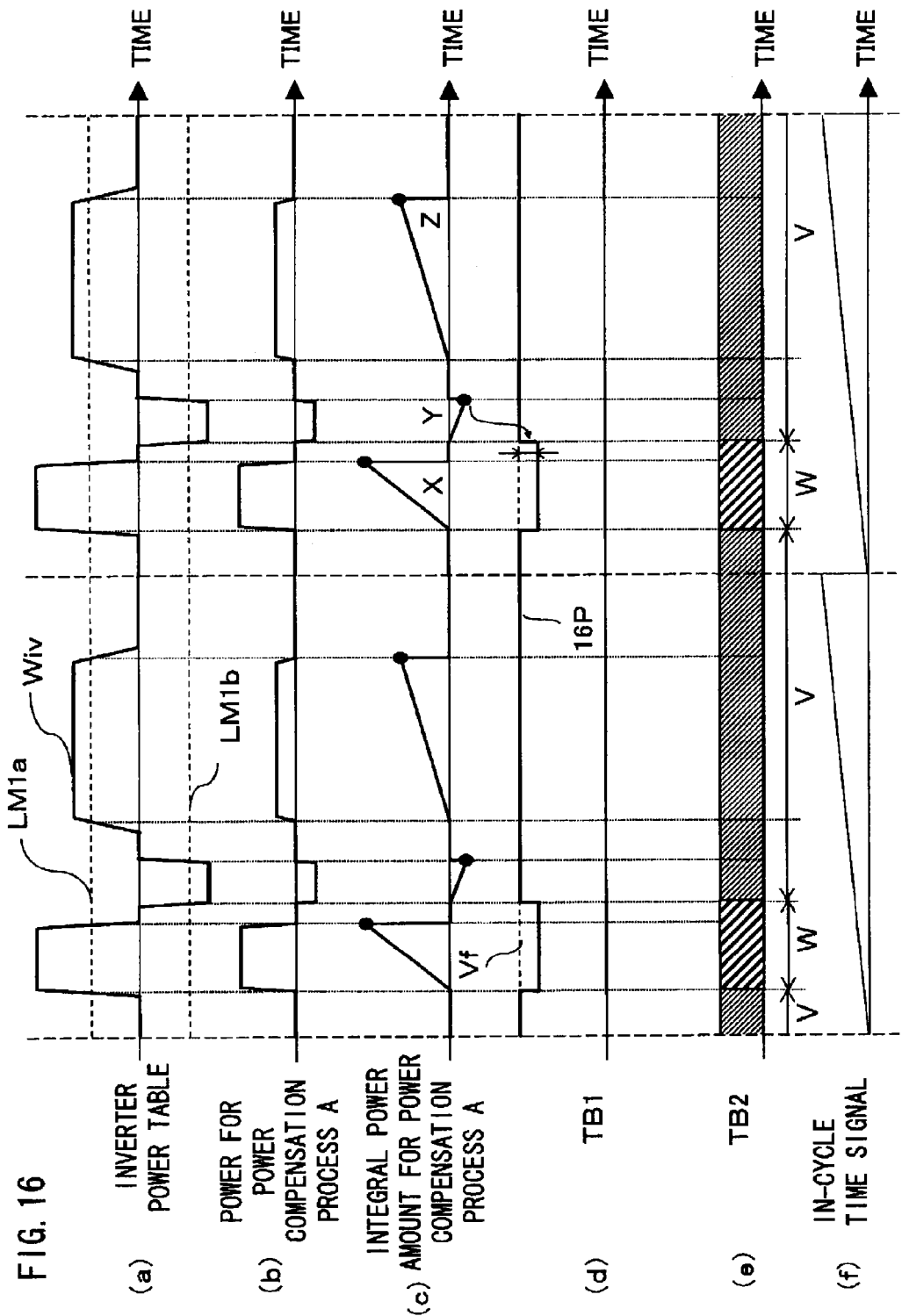
FIG. 16 is a time chart for illustrating another voltage instruction setting operation for the power storage device by the power compensator included in the AC motor driving apparatus according to Embodiment 3 of the present invention.

It is noted that with regard to the power-storage-device voltage instruction table TB1 and the power-storage-device voltage instruction state transition table TB2 described with reference to FIG. 15, a method may be adopted in which the voltage instruction 16P is previously decreased in preparation for the case of charging the power storage device 15 in response to regeneration power demand as shown in FIG. 16, and the rated voltage Vf of the power storage device 15 is used as an instruction if it is not in such a case. In this case as well, the power-storage-device voltage instruction state transition table TB2 can be similarly set.

In the process of generating the tables TB1 and TB2 described above, prior to an operation of the AC motor driving apparatus, a process may be performed offline to obtain a voltage instruction pattern for the power storage device 15 and the pattern may be stored in a storage unit included in the control device 16, or inverter power or power required for the power compensation process A may be previously stored in the storage unit and the voltage instruction 16P may be obtained online after start of an operation of the AC motor driving apparatus.

Figure 17:
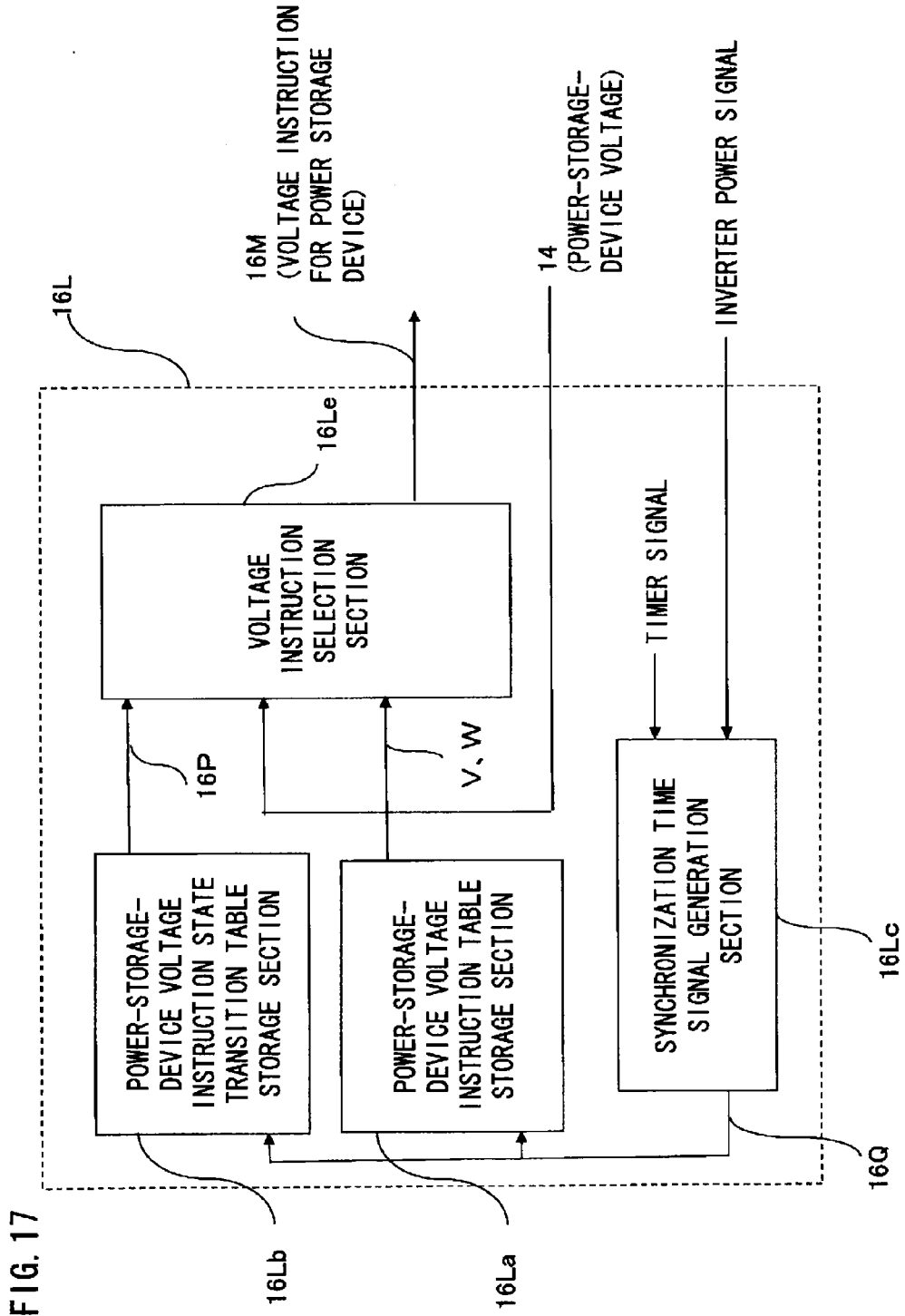
FIG. 17 is a configuration diagram showing a detail of a power storage device voltage instruction generation section provided within the power compensator in the AC motor driving apparatus according to Embodiment 3 of the present invention.

FIG. 17 is a configuration diagram showing a detail of the power-storage-device voltage instruction section 16L provided in the constant voltage control section 16E within the control device 16 in the AC motor driving apparatus according to Embodiment 3.

Instead of the configuration in Embodiment 1 (see FIG. 9), the power-storage-device voltage instruction section 16L of Embodiment 3 includes a power-storage-device voltage instruction table storage section 16La, a power-storage-device voltage instruction state transition table storage section 16Lb, and a synchronization time signal generation section 16Lc.

In the power-storage-device voltage instruction table storage section 16La, the power-storage-device voltage instruction table TB1 shown in FIG. 15(*d*) or 16(*d*) is patterned and stored, and in the power-storage-device voltage instruction state transition table storage section 16Lb, the power-storage-device voltage instruction state transition table TB2 shown in FIG. 15(*e*) or 16(*e*) is patterned and stored. Furthermore, in the synchronization time signal generation section 16Lc, a power pattern for the inverter 3 is stored.

The synchronization time signal generation section 16Lc receives a power signal of the inverter 3 and a timer signal, collates these signals with a built-in power table for the inverter 3, determines which time point in the periodical power pattern for the inverter 3 the present time corresponds to, and outputs the time point as an in-cycle time signal 16Q. As the power signal of the inverter 3, the signal Wiv described in Embodiment 1 is used. With reference to the in-cycle time signal 16Q, information of the voltage instruction 16P is time-sequentially read out from the power-storage-device voltage instruction table TB1 stored in the power-storage-device voltage instruction table storage section 16La, and interval information of each of the states V and W in the power-storage-device voltage instruction state transition table TB2 stored in the power-storage-device voltage instruction state transition table storage section 16Lb is also time-sequentially read out, and these pieces of information are inputted to a voltage instruction selection section 16Le. At the same time, the power-storage-device voltage 14 detected by the detector 12 is also inputted into the voltage instruction selection section 16Le. The voltage instruction selection section 16Le refers to the interval information of each of the states V and W in the power-storage-device voltage instruction state transition table TB2, selects either the power-storage-device voltage 14 or the voltage instruction 16P designated by the power-storage-device voltage instruction table TB1, and outputs the selected one as the voltage instruction 16M for the power storage device 15.

For example, if an interval designated by the power-storage-device voltage instruction state transition table TB2 is the interval of the state of the reference character V in FIG. 15 and the power-storage-device voltage 14 is lower than the voltage instruction 16P read out from the power-storage-device voltage instruction table storage section 16La, it is necessary to charge the power storage device 15. In this case, the voltage instruction 16P read out from the power-storage-device voltage instruction table storage section 16La is selected and outputted as the voltage instruction 16M for the power storage device 15.

In addition, if an interval designated by the power-storage-device voltage instruction state transition table TB2 is the interval of the state of the reference character V in FIG. 15 and the power-storage-device voltage 14 is higher than the voltage instruction 16P read out from the power-storage-device voltage instruction table storage section 16La, the power storage device 15 is in a state where required minimum power has already been stored therein. Then, in this case, charging/discharging is not particularly necessary, and the power-storage-device voltage 14 is selected and outputted as the voltage instruction 16M for the power storage device 15. By so doing, the input of the integrator 41 becomes "0" and the operation can be stopped in the constant voltage control section 16E shown in FIG. 9.

Furthermore, if an interval designated by the power-storage-device voltage instruction state transition table TB2 is the interval of the state of the reference character W in FIG. 15 and the power-storage-device voltage 14 is higher than the voltage instruction 16P read out from the power-storage-device voltage instruction table storage section 16La, discharging is necessary. In this case, the voltage instruction 16P read out from the power-storage-device voltage instruction table storage section 16La is outputted as the voltage instruction 16M for the power storage device 15.

Moreover, if an interval designated by the power-storage-device voltage instruction state transition table TB2 is the period indicated by the reference character W in FIG. 15 and the power-storage-device voltage 14 is lower than voltage instruction 16P read out from the power-storage-device voltage instruction table storage section 16La, a voltage difference from the rated voltage Vf of the power storage device 15 is ensured sufficiently, and a required minimum capacity for charging remains in the power storage device 15. Then, in this case, charging/discharging is not particularly necessary, and the power-storage-device voltage 14 is selected and outputted as the voltage instruction 16M for the power storage device 15. By so doing, the input of the integrator 41 becomes "0" and the operation can be stopped in the constant voltage control section 16E shown in FIG. 9.

As described above, in the AC motor driving apparatus according to Embodiment 3, when power required by the inverter 3 is previously recognized, the voltage instruction 16M for the power storage device 15 is derived with the power-storage-device voltage instruction table storage section 16La and the voltage instruction state transition table storage section 16Lb which are provided in the constant voltage control section 16E of the control device 16 and have stored therein the power-storage-device voltage instruction table TB1 and the power storage device voltage instruction state transition table TB2, respectively, whereby the power storage adjustment process B can be performed. Thus, the power storage device 15 can be efficiently used. Therefore, the capacity of the battery or the capacitor used for the power storage device 15 can be reduced, and reduction of the cost and the size of the AC motor driving apparatus can be achieved. In particular, this is effective for the case where the same power demand repeatedly occurs in the inverter 3.

Embodiment 4

In the power compensator 5 of the AC motor driving apparatus according to Embodiment 3 described above, the power-storage-device voltage instruction table storage section 16La having stored therein the power-storage-device voltage instruction table TB1 and the power-storage-device voltage instruction state transition table storage section 16Lb having stored therein the power-storage-device voltage instruction state transition table TB2 are provided as the power-storage-device voltage instruction section 16L, and a voltage instruction is set on the basis of information read out from these storage sections 16La and 16Lb. However, a configuration is also possible in which the information in the power-storage-device voltage instruction table TB1 and the power-storage-device voltage instruction state transition table TB2 can be acquired from an external controller via communication.

For example, the AC motor driving apparatus used for a working machine or the like is used in combination with a numerical controller (NC) 71. In the numerical controller 71, a position or speed instruction for the AC motor 4 is generated. In addition, it can be often recognized in what manner the AC motor 4 will operate a little later. Thus, information of power demand required by the inverter 3 connected to the AC motor 4 can be obtained prior to an actual operation of the AC motor 4, and an amount of power of the power storage device 15 can be prepared according to the power demand of the inverter 3 by using the information.

Figure 18:
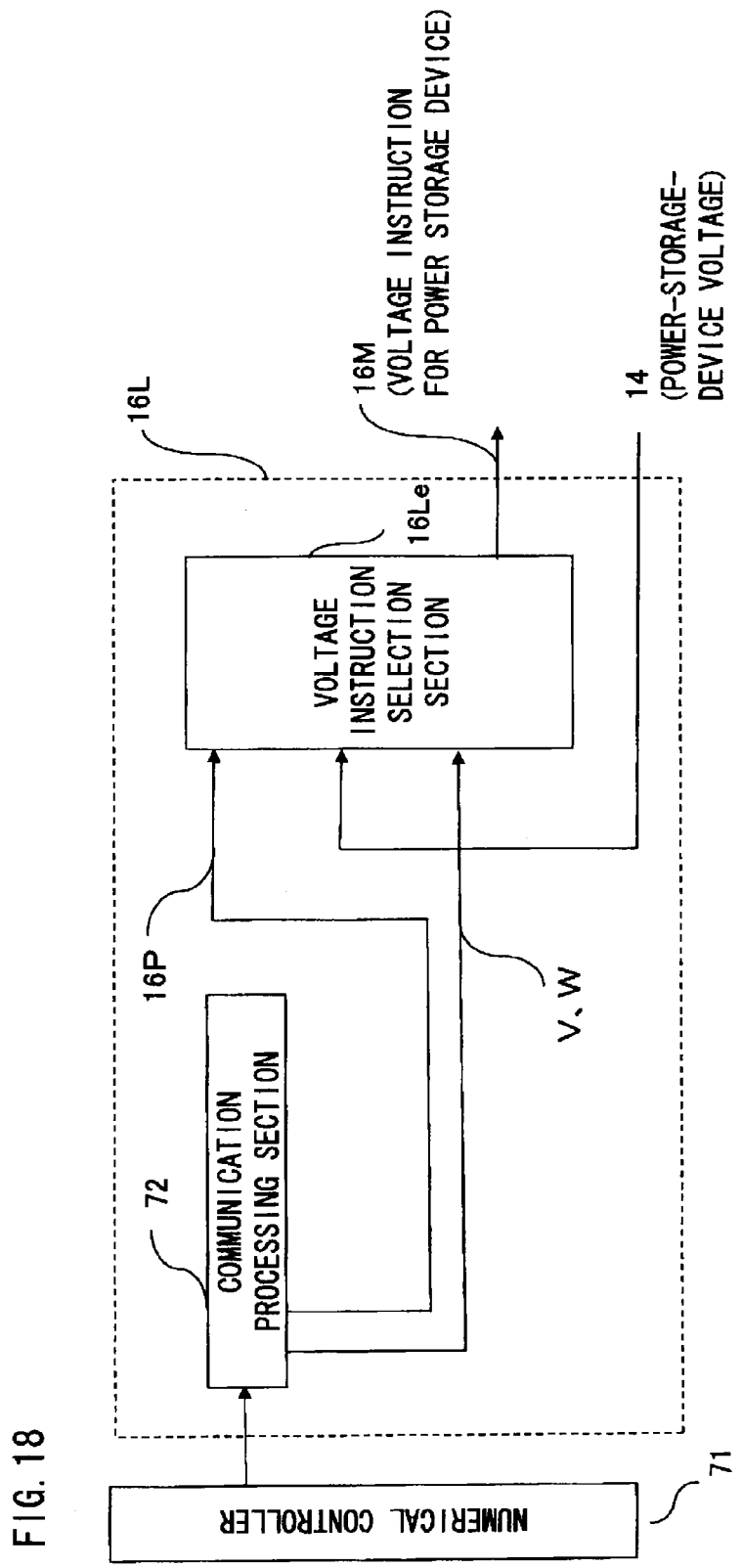
FIG. 18 is a configuration diagram showing a detail of a power storage device voltage instruction generation section provided within a power compensator in an AC motor driving apparatus according to Embodiment 4 of the present invention.

FIG. 18 shows an example of a configuration in which the information in the power-storage-device voltage instruction table TB1 and the power-storage-device voltage instruction transition table TB2 can be acquired from the outside of the AC motor driving apparatus via communication.

Specifically, the numerical controller 71 is used as an external controller, and in the numerical controller 71, power of the AC motor 4 is estimated from the position/speed instruction, the used state, or the like of the AC motor 4, and power of the inverter 3 is obtained in consideration of power loss in the inverter 3. Furthermore, the power-storage-device voltage instruction table TB 1 and the power-storage-device voltage instruction state transition table TB2 are created by using the process described in above Embodiment 3, and instruction information of the voltage instruction 16P in the power-storage-device voltage instruction table TB1 and information of each of the intervals V and W in the power-storage-device voltage instruction state transition table TB2 are inputted to the voltage instruction selection section 16Le via a communication line 72 and a communication processing section 72 as communication means. Then, the power storage adjustment process B is performed in the control device 16 of the power compensator 5 on the basis of these pieces of inputted information.

It is noted that the voltage instruction 16P and the information of each of the intervals V and W may not be acquired from the numerical controller 71, and power information of the inverter 3, a position/speed instruction signal and a used state operation instruction signal of the AC motor 4, and the like may be acquired. In this case, the process of creating information in the power-storage-device voltage instruction table TB 1 and the power-storage-device voltage instruction state transition table TB2, which process is performed in the numerical controller 71, is performed in the control device 16 of the AC motor driving apparatus.

Alternatively, instead of the synchronization time signal generation section 16Lc described in Embodiment 3, the in-cycle time signal 16Q or a synchronization trigger signal giving notification of start of a power pattern for the inverter 3 or state change in TB2 shown in FIG. 15 or 16 may be acquired from the numerical controller 71, and the in-cycle time signal 16Q may be generated on the basis of this signal. With this configuration, it is unnecessary to include the power pattern for the inverter 3.

As described above, according to Embodiment 4, an amount of power of the power storage device 15 can be previously prepared according to power demand of the inverter 3. Thus, the power storage device 15 can be efficiently used. Therefore, the capacity of the battery or the capacitor used for the power storage device 15 can be reduced, and reduction of the cost and the size of the AC motor driving apparatus can be achieved. In particular, this is effective for the case of being connected to an external controller such as the numerical controller 71.

The invention claimed is:
1. An AC motor driving apparatus comprising:
a DC power supply which supplies DC power;
an inverter which is connected to the DC power supply via a DC bus bar and converts the DC power to AC power and supplies the AC power to an AC motor; and
a power compensator which is connected in parallel with a DC power input portion of the inverter, wherein
the power compensator includes: a power storage device which absorbs/discharges power; a step-up/down circuit which is connected between the DC bus bar and the power storage device and converts a voltage level; and a control device which controls the step-up/down circuit for exchanging DC power between the DC bus bar and the power storage device, and
the control device performs:
(A) a power compensation process A in which in a period when DC-power-supply power exchanged by the DC power supply exceeds a DC-power-supply power running power limit determined on the basis of power which can be supplied by the DC power supply, power supplied from the DC power supply is reduced to the DC-power-supply power running power limit by discharging energy stored in the power storage device, and in a period when the DC-power-supply power is less than a DC-power-supply regeneration power limit determined on the basis of power which can be regenerated by the DC power supply, power regenerated to the DC power supply is suppressed to the DC-power-supply regeneration power limit by charging the power storage device with energy; and
a power storage adjustment process B including:
(B-1) a process in which in the period when the DC-power-supply power exceeds the DC-power-supply power running power limit, energy of the power storage device is discharged to the inverter or the DC power supply such that a voltage of the power storage device becomes a predetermined value;
(B-2) a process in which in the period when the DC-power-supply power is less than the DC-power-supply regeneration power limit, the power storage device is charged with energy from the inverter or the DC power supply such that the voltage of the power storage device becomes a predetermined value; and
(B-3) a process in which in a period when the DC-power-supply power is not less than the DC-power-supply regeneration power limit and is not greater than the DC-power-supply power running power limit, the power storage device is charged in a power range of a difference between the DC-power-supply power running power limit and required power of the inverter, or is discharged in a power range of a difference between the required power of the inverter and the DC-power-supply regeneration power limit, such that the voltage of the power storage device becomes a predetermined value.

2. The AC motor driving apparatus according to claim 1, wherein
the control device has a first threshold which is set to a value less than the DC-power-supply power running power limit and a second threshold which is set to a value greater than the DC-power-supply regeneration power limit, and
in the power compensation process A of the control device, in a period when the DC-power-supply power exceeds the first threshold, the power supplied from the DC power supply is suppressed to the DC-power-supply power running power limit by discharging the energy stored in the power storage device, and in a period when the DC-power-supply power is less than the second threshold, the power regenerated to the DC power supply is suppressed to the DC-power-supply regeneration power limit by charging the power storage device with energy.

3. The AC motor driving apparatus according to claim 1, wherein
the control device includes a storage section which stores a voltage instruction pattern for the power storage device in the power storage adjustment process B, the voltage instruction pattern being calculated on the basis of a power pattern representing a change of power required by the inverter or a power pattern for the power compensation process A representing a change of charging/discharging power of the power storage device in the power compensation process A, and
the control device performs charging/discharging of the power storage device in the power storage adjustment process B on the basis of the voltage instruction pattern.

4. The AC motor driving apparatus according to claim 3, wherein the control device: includes a communication processing section which communicates with an external control device which determines an operation of the AC motor; receives, from the external control device, the power pattern, the power pattern for the power compensation process A, or the voltage instruction pattern for the power storage device; and performs charging/discharging of the power storage device in the power storage adjustment process B on the basis of the received information.

5. The AC motor driving apparatus according to claim 1, wherein the control device limits a charging/discharging current of the power storage device in the power compensation process A on the basis of a predetermined charging/discharging current limit for the power storage device.

6. The AC motor driving apparatus according to claim 5, wherein the control device limits a charging/discharging current of the power storage device in the power storage adjustment process B on the basis of the charging/discharging current limit for the power storage device.

* * * * *